US012700608B2

(12) United States Patent
Kim et al.

(10) Patent No.: US 12,700,608 B2
(45) Date of Patent: Aug. 4, 2026

(54) METHOD AND APPARATUS FOR CONTROLLING SEPARATOR TENSION OF LAMINATED PLATES OF SECONDARY BATTERY

(71) Applicant: MPLUS CORP., Cheongun-si (KR)

(72) Inventors: Jong Sung Kim, Seongnam-si (KR); Moo Yeon Ma, Hwaseong-si (KR); Sun Ho Jung, Daejeon (KR); Sang Gil Park, Cheongju-si (KR)

(73) Assignee: MPLUS CORP., Cheongun-si (KR)

( * ) Notice: Subject to any disclaimer, the term of this patent is extended or adjusted under 35 U.S.C. 154(b) by 710 days.

(21) Appl. No.: 18/070,488

(22) Filed: Nov. 29, 2022

(65) Prior Publication Data

US 2024/0178431 A1 May 30, 2024

(51) Int. Cl.
*H01M 10/04* (2006.01)
*B65H 23/188* (2006.01)

(52) U.S. Cl.
CPC .... *H01M 10/0404* (2013.01); *B65H 23/1888* (2013.01); *H01M 10/0459* (2013.01); *B65H 2404/1521* (2013.01)

(58) Field of Classification Search
CPC ......... H01M 10/0459; H01M 10/0404; H01M 10/04; H01M 10/20
See application file for complete search history.

(56) References Cited

U.S. PATENT DOCUMENTS

| | | | | |
|---|---|---|---|---|
| 2,005,275 A | * | 6/1935 | Thomas | H01M 50/00 |
| | | | | 429/130 |
| 2006/0051652 A1 | * | 3/2006 | Samuels | B65H 29/241 |
| | | | | 429/514 |

FOREIGN PATENT DOCUMENTS

| | | |
|---|---|---|
| KR | 10-2015-0111551 A | 10/2015 |
| KR | 10-2096934 B1 | 4/2020 |
| KR | 10-2020-0104190 A | 9/2020 |

* cited by examiner

*Primary Examiner* — Kenneth J Douyette

(57) ABSTRACT

Proposed are a separator tension controlling apparatus and method for stacking an electrode plate of a secondary battery. The apparatus includes a separator loading member on which a fixing plate is mounted such that a separator loading unit, a separator supplying member, and a separator moving member which are mounted on an upper surface of a table are capable of being mounted so that a negative electrode and a positive electrode of the secondary battery are capable of being stacked to cross each other by a separator, the separator supplying member mounted on a first side of the separator loading unit such that the separator is capable of being supplied to the separator loading unit, and the separator moving member mounted on an upper side of the separator loading member such that the separator supplied from the separator supplying member is capable of being supplied with uniform tension.

16 Claims, 14 Drawing Sheets

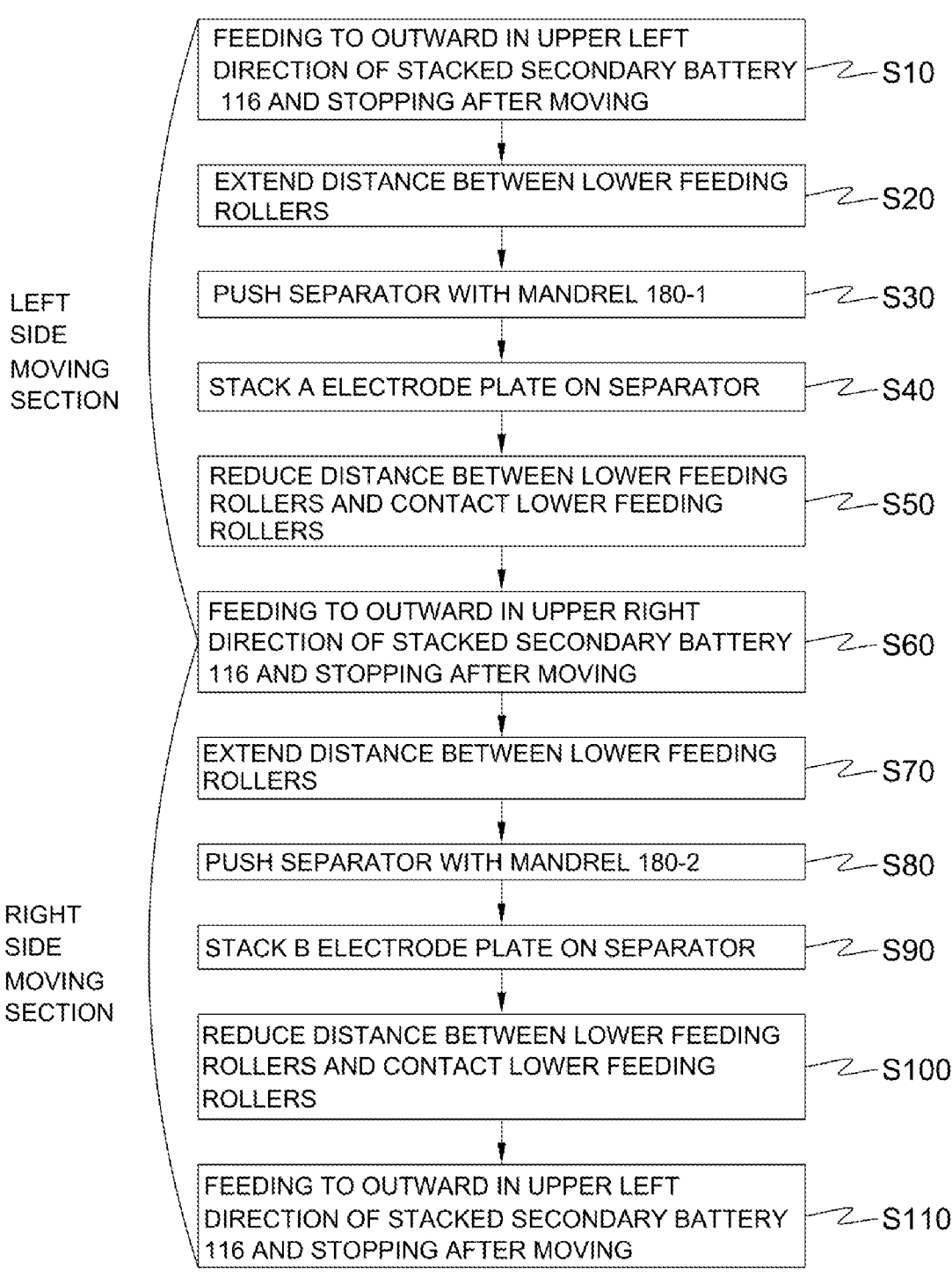

LEFT SIDE MOVING SECTION

FEEDING TO OUTWARD IN UPPER LEFT DIRECTION OF STACKED SECONDARY BATTERY 116 AND STOPPING AFTER MOVING — S10

EXTEND DISTANCE BETWEEN LOWER FEEDING ROLLERS — S20

PUSH SEPARATOR WITH MANDREL 180-1 — S30

STACK A ELECTRODE PLATE ON SEPARATOR — S40

REDUCE DISTANCE BETWEEN LOWER FEEDING ROLLERS AND CONTACT LOWER FEEDING ROLLERS — S50

FEEDING TO OUTWARD IN UPPER RIGHT DIRECTION OF STACKED SECONDARY BATTERY 116 AND STOPPING AFTER MOVING — S60

RIGHT SIDE MOVING SECTION

EXTEND DISTANCE BETWEEN LOWER FEEDING ROLLERS — S70

PUSH SEPARATOR WITH MANDREL 180-2 — S80

STACK B ELECTRODE PLATE ON SEPARATOR — S90

REDUCE DISTANCE BETWEEN LOWER FEEDING ROLLERS AND CONTACT LOWER FEEDING ROLLERS — S100

FEEDING TO OUTWARD IN UPPER LEFT DIRECTION OF STACKED SECONDARY BATTERY 116 AND STOPPING AFTER MOVING — S110

FIG. 11
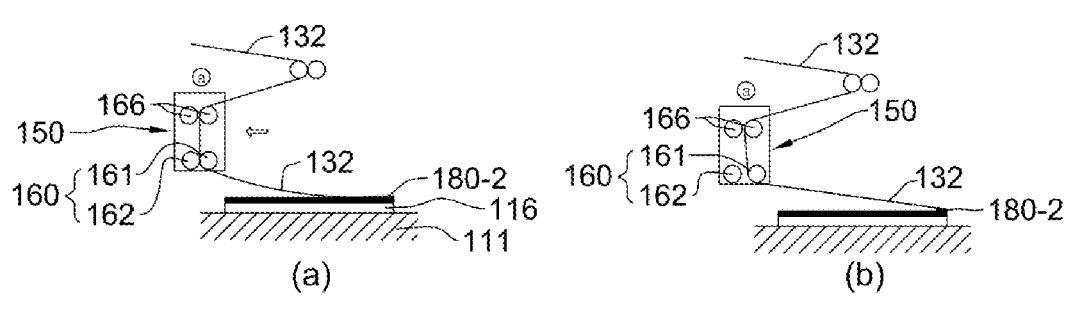
(a)            (b)
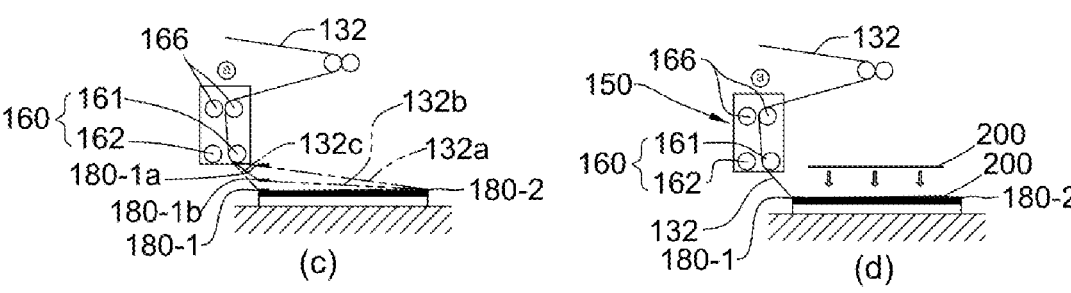
(c)            (d)
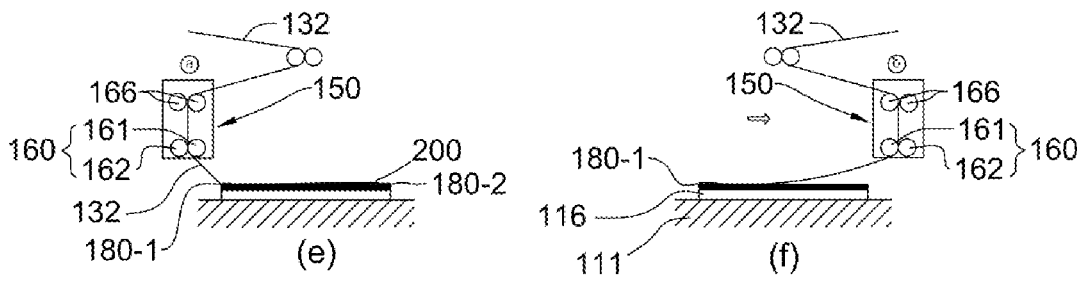
(e)            (f)

FIG. 12
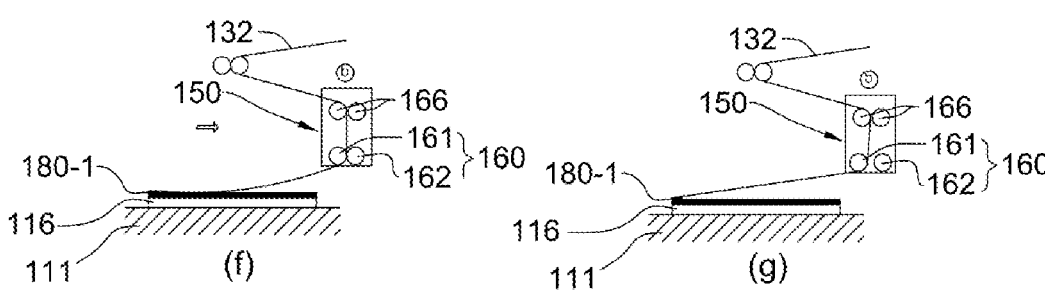
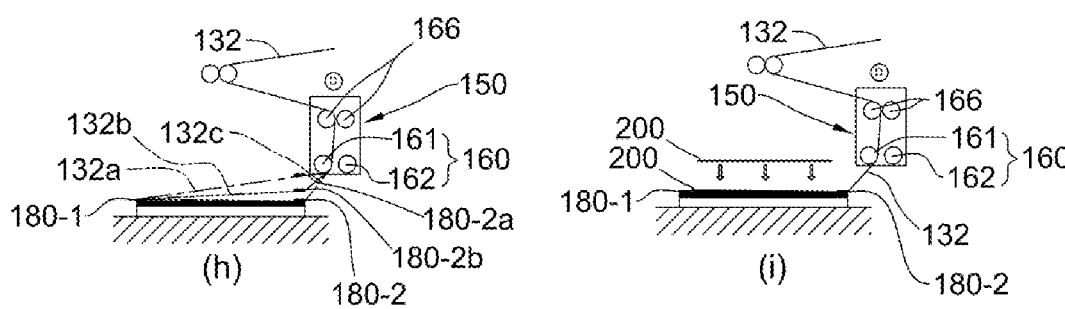
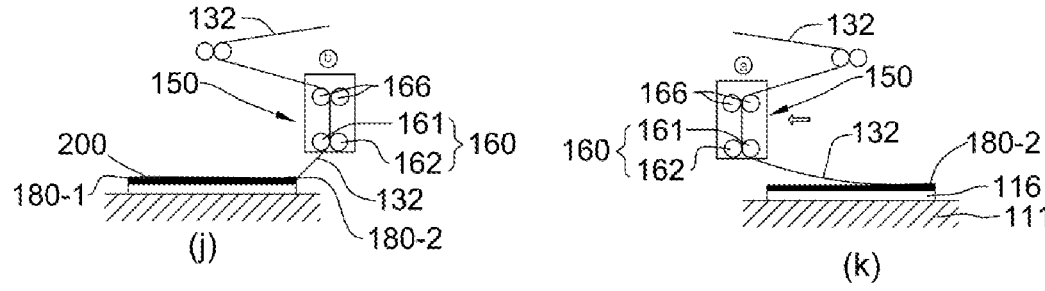

METHOD AND APPARATUS FOR CONTROLLING SEPARATOR TENSION OF LAMINATED PLATES OF SECONDARY BATTERY

BACKGROUND OF THE INVENTION

Field of the Invention

The present disclosure relates to a separator tension controlling apparatus and a separator tension controlling method, the apparatus and the method for stacking an electrode plate of a secondary battery. More particularly, the present disclosure relates to a separator tension controlling apparatus and a separator tension controlling method, the apparatus and the method being configured such that a separator interposed between a negative electrode plate and a positive electrode plate of the secondary battery is folded while the separator is spaced apart from ends of the electrode plates by a predetermined distance and tension applied to the separator is constant, thereby preventing a reverse movement phenomenon of the separator and also capable of more rapidly moving the separator so that stacking operation time of the secondary battery is capable of being reduced.

Description of the Related Art

Generally, a chemical cell is constituted of electrolyte and a pair of electrodes including a positive electrode plate and a negative electrode plate, and the amount of energy that can be stored in the chemical cell varies according to materials constituting the electrodes and the electrolyte.

Such chemical cells are classified into a primary battery used only for one-time discharge due to a very slow charging reaction and a secondary battery that can be reused through repetitive charging and discharging. Recently, the use of the secondary battery is increasing due to the advantage of charging and discharging.

Due to the advantage of the secondary battery, the secondary battery has been applied to various technical fields throughout industry and is widely used as an energy source of a mobile communication device such as a smartphone, and is attracting attention as an energy source of an electric vehicle.

Such a secondary battery is manufactured in a form in which a positive electrode plate, a separator, and a negative electrode plate are sequentially stacked to be immersed in an electrolyte. There are two main methods of manufacturing an inner cell stack of the secondary battery.

In the case of a small secondary battery, a method of arranging a negative electrode plate and a positive electrode plate on a separator and winding them in a jelly-roll form is widely used.

Meanwhile, in the case of a medium and large secondary battery having more electric capacity, a method of arranging a negative electrode plate and a positive electrode plate by stacking them in a proper order with a separator is widely used.

Particularly, in the stacking method, electrode plates obtained by blanking are mainly used, and thus the battery has excellent performance due to a relatively large space through which the electrolyte solution penetrates between the edges of the electrode plates and the separator.

In the zigzag-type (also referred to as a 'z-folding' type) stacking method widely used among the methods of manufacturing a secondary battery cell stack in a stacking manner, the separator forms a zigzag folded shape, and the negative electrode plates and the positive electrode plates are alternately stacked in an inserted form.

FIGS. 1A and 1B are views schematically illustrating a configuration of a conventional process of stacking a separator of a secondary battery.

FIGS. 1A and 1B illustrate a representative zigzag-type (also referred to as a 'z-folding' type) stacking method.

In FIGS. 1A and 1B, a negative electrode plate, a positive electrode plate, and a separator that are stacked on a stacking table are schematically illustrated. Furthermore, a separator reciprocating unit 15 mounted above the stacking table is configured to continuously supply the separator by performing a reciprocating movement so as to coat a secondary battery on the stacking table.

At this time, in the separator of the separator reciprocating unit 15 moved to the left side of the stacking table, a situation in which a part of the separator is loosely folded when the separator is moved to the left side from a center position and a part of the separator is loosely folded when the separator is moved to the right side from the center position occurs.

This is because a path of a separator 13 is reduced and increased according to a position of the separator reciprocating unit 15, the separator 13 being supplied from the separator reciprocating unit 15 that has an inner portion provided with upper guide rollers 17 and lower guide rollers 16 that are guiding the separator 13 in a vertical direction. When the path is reduced, an extra separator is generated. Although not illustrated in the drawing, a buffer roller is mounted at an upper side where the separator 13 is supplied, and a constant tension is maintained by accommodating the extra separator. This phenomenon in which the separator moves backward is called a reverse movement phenomenon.

That is, in a state in which there is no tension due to the reverse movement phenomenon since the tension is not applied to the separator having an extra length, the tension is applied to the separator 13 since the separator 13 is suddenly pulled by the reverse movement phenomenon. Furthermore, the separator 13 is folded on the guide rollers 16 and 17 by the tension and the separator 13 is in a state in which there is no tension due to the extra length, the guide rollers 16 and 17 are detached from the separator 13, and the separator 13 is attached to the guide rollers 16 and 17 again when the tension is generated. At this time, since a position where the guide rollers 16 and 17 contact is changed by the tension, the moving path of the separator is changed according to the change in the tension when the reverse movement phenomenon occurs, and a meandering phenomenon occurs, so that there is a problem that a stacking quality of the separator is deteriorated.

In addition, when a reaction speed of the buffer roller accommodating the separator is slow, the extra separator cannot be accommodated immediately. Therefore, a tension hunting phenomenon (a phenomenon in which a tension increases and decreases rapidly) in which the tension of the separator becomes zero and becomes to a constant tension occurs, and an adverse effect is applied in stacking the electrode plate. Therefore, in order to solve the problem of deterioration in the quality of stacking of the secondary battery, the need to prevent the reverse movement phenomenon has emerged.

The reverse movement phenomenon according to the position in FIGS. 1A and 1B will be described. In FIG. 1A, a single operation of supplying the separator 13 by moving the separator reciprocating unit 15 to a position 4 from a position (1), a mandrel 18 pushes and fixes the separator 13, and any one of the negative electrode plate and the positive electrode plate are mounted on a normal position of the separator 13. In FIG. 1B, by moving in a reverse direction, the separator reciprocating unit 15 is moved to a position 8 from a position 55 that is the same as the position 4 and the next separator 13 is supplied, and a single cycle operation in which the mandrel 18 pushes and fixes the separator 13 and the other one of the negative electrode plate and the positive electrode plate is placed on a normal position on the separator 13.

At this time, referring to an interrelationship between the separator reciprocating unit 15 at the position (1) and the mandrel 18, the separator reciprocating unit 15 at the position (1) is positioned at a position that is fixed to the left side, and the mandrel 18 has a shape in which the mandrel 18 pushes the separator 13 at a constant pressure such that the separator 13 is not pulled toward the separator reciprocating unit 15. Furthermore, the separator 13 connected between the separator reciprocating unit 15 at the position (1) and the mandrel 18 is applied with a constant tension, and the separator 13 connected between the left mandrel 18 and the right mandrel 18 is also applied with a constant tension.

However, when the separator reciprocating unit 15 is moved to the position (2) from the position (1), a length of the separator 13 between the separator reciprocating unit 15 at the position (1) and the mandrel 18 and a length of the separator 13 between the separator reciprocating unit 15 at the position (2) and the mandrel 18 are reduced. Therefore, a phenomenon (hereinafter, referred to as the reverse movement phenomenon) in which the tension of the separator 13 is released and the part of the separator is loosely hung down momentarily occurs even if a supply portion of the separator 13 of the separator reciprocating unit absorbs the tension.

At this time, the tension of the separator 13 is released and the position of the separator 13 contact with the lower guide rollers 16 may be detached and changed. Furthermore, since the mandrel 18 does not push an entire of a side surface of a stacked secondary battery 12, the tension applied to the separator 13 is increased or decreased according to a position, so that a shrink phenomenon and a tilt phenomenon of a product occur.

When an operation is performed and the separator reciprocating unit 15 is moved to the position (3) from the position (2), a speed of the separator 13 supplied through the separator reciprocating unit 15 gradually increases from a state in which a speed of the separator 13 is stopped from the mandrel 18, and the separator 13 is supplied to a similar uniform speed when the separator reciprocating unit 15 moves to the position (4).

However, in a process after the mandrel 18 pushes the separator 13 is repeated by performing an order illustrated in FIG. 1A in a reverse manner as illustrated in FIG. 1B, so that the phenomenon (hereinafter, referred to as the reverse movement phenomenon) in which the tension of the separator is released occurs.

That is, as the moving speed of the separator reciprocating unit 15 gradually increases and moves according to a user's request, the phenomenon (hereinafter, referred to as the reverse movement phenomenon) in which the tension of the separator is released and the part of the separator supplied through the separator reciprocating unit 15 is loosely folded occurs more frequently, so that there is a need to prevent the reverse movement phenomenon in order to solve this problem.

FIGS. 2A and 2B are schematic views illustrating a state in which a rotary dancer is mounted in the separator tension controlling apparatus for stacking the electrode plate of the secondary battery.

FIG. 2A is a view schematically illustrating a rotary dancer 20 mounted in a separator reciprocating unit 15, and FIG. 2B is a three-dimensional view illustrating the separator reciprocating unit 15 in which the rotary dancer 20 is mounted.

As illustrated in FIGS. 2A and 2B, the rotary dancer 20 is mounted in the separator reciprocating unit 15 so as to control the tension of the separator 13.

Such a rotary dancer 20 is mounted between lower rollers 26 and upper rollers 17, and the rotary dancer 20 is configured to be rotated by a predetermined angle such that the tension of the separator is capable of being controlled.

As the rotary dancer 20 is rotated by a limited angle by elasticity of a cylinder or a spring, and the tension of the separator is controlled.

Such a conventional rotary dancer 20 increases a weight of the separator reciprocating unit 15 as the rotary dancer 20 is mounted in the separator reciprocating unit 15. Furthermore, in a state in which the weight of the separator reciprocating unit 15 is heavy, as the separator reciprocating unit 15 performs a reciprocating movement, a moving speed of the separator reciprocating unit 15 is reduced. Therefore, it is expected that a more rapid moving stacking speed that a customer requires is difficult to be realized while the tension of the separator supplied through the separator reciprocating unit 15 is constantly maintained.

That is, as illustrated in FIGS. 1A and 1B, not only the part of the tension of the separator reciprocating unit 15 is loosened, and also the configuration may be very disadvantageous configuration for gradually increasing the moving speed of the separator reciprocating unit 15. Therefore, it is preferable to configure the separator reciprocating unit 15 with a lighter weight.

As another example, in Patent Document 1, 'METHOD AND APPARATUS FOR STACKING ELECTRODE PLATE OF PRISMATIC SECONDARY BATTERY' is proposed.

In Patent Document 1 of the method and apparatus for stacking the electrode plate of the prismatic secondary battery, the apparatus for stacking the electroplate of the prismatic secondary battery in which a positive electrode plate and a negative electrode plate are alternately supplied on a stack base and the a separator is supplied between the positive electrode plate and the negative electrode plate includes four stack grippers (each stack gripper is provided with a holding portion capable of performing a swing movement) reciprocating together with the stack base, the four stack grippers being arranged adjacent to an edge portion of the electrode plate that is suppled on the stack base, the stack base being reciprocating between a positive electrode plate supplying position and a negative electrode plate supplying position. Furthermore, the four stack grippers are synchronized and operated in pairs of two, the electrode plate supplied on the stack base is held by a pair of holding portion provided at the pair of stack grippers positioned at ends in a following moving direction of the stack base among the four stack grippers. Furthermore, a front and rear actuator that moves the stack gripper in a front direction or a rear direction and a swing actuator swinging-up or swinging-down the holding portion are included.

In Patent Document 2, 'APPARATUS FOR STACKING ELECTRODE PLATE FOR SECONDARY BATTERY' is proposed.

In Patent Document 1 of the apparatus for stacking the electrode plate for the secondary battery, the apparatus includes: a transferring portion provided with a suction conveyer for moving an electrode plate for a secondary battery along a transferring line while the electrode plate for the secondary battery is suctioned by a vacuum pressure; an arm divided rotating body in which a plurality of pick-up arms is disposed in a radial direction with respect to a center portion, the arm divide rotating body being configured to allow the pick-up arms to pull an electrode plate from an electrode plate stacked magazine in which multiple electrode plates are stacked; a rotor unit configured to perform a primary electrode plate separation operation such that only one electrode plate remains on the pick-up arms by a rotational inertia when the electrode plate is pulled from the electrode plate stacked magazine with the pick-up arms of the arm divided rotating body; a vibrational unit configured to perform a secondary electrode plate separation function that prevents at least one electrode plate to be attached to the pick-up arms by applying vibration to the arm divided rotating body by the rotor unit; and an electrode plate dropping unit configured to perform a tertiary electrode plate separation operation that separates the remaining electrode plates while only one electrode plate is transferred from the suction conveyer when the electrode plate is suctioned and transferred to the suction conveyer by the pick-up arms of the arm divided rotating body.

Since Patent Documents 1 and 2 were studied, but no research results were found on an effect of a change in tension of a separator on the quality of the secondary battery that is the result of work, so that there is a need for a solution capable of preventing the occurrence of defects in a secondary battery caused by rapid increase or decrease in tension in order to more efficiently operate transferring of an electrode plate.

Document of Related Art (Patent Document 1) Korean Patent Application Publication No. 10-2020-0104190
(Patent Document 2) Korean Patent Application Publication No. 10-2015-0111551
(Patent Document 3) Korean Patent No. 10-2096934

SUMMARY OF THE INVENTION

Accordingly, the present disclosure has been made keeping in mind the above problems occurring in the related art, and an objective of the present disclosure is to provide a separator tension controlling apparatus and a separator tension controlling method for stacking an electrode plate of a secondary battery, the apparatus and the method being capable of significantly reducing manufacturing time of the secondary battery by more rapidly moving a separator that is interposed between two electrode plates.

Another objective of the present disclosure is to provide a separator tension controlling apparatus and a separator tension controlling method for stacking an electrode plate of a secondary battery, the apparatus and the method being capable of more rapidly moving a separator moving member by reducing a weight of the separator moving member that controls a tension of a separator.

Still another objective of the present disclosure is to provide a separator tension controlling apparatus and a separator tension controlling method for stacking an electrode plate of a secondary battery, the apparatus and the method being capable of stacking a separator on the electrode plate with a constant tension by uniformly pulling the tension of the separator such that a reverse movement phenomenon of the separator does not occur during performing the stacking of the secondary battery.

In order to achieve the above objectives, according to the present disclosure, there is provided a separator tension controlling apparatus for stacking an electrode plate of a secondary battery, the apparatus including: a separator loading member on which a fixing plate is mounted such that a separator loading unit, a separator supplying member, and a separator moving member which are mounted on an upper surface of a table are capable of being mounted so that a negative electrode and a positive electrode of the secondary battery are capable of being stacked to cross each other by a separator; the separator supplying member mounted on a first side of the separator loading unit such that the separator is capable of being supplied to the separator loading unit; and the separator moving member mounted on an upper side of the separator loading member such that the separator supplied from the separator supplying member is capable of being supplied with uniform tension, wherein the separator moving member may be configured to be moved outward of the secondary battery that is stacked such that a tension of the separator is capable of being controlled, and a distance between a pair of lower feeding rollers that is mounted on the separator moving member may be spaced apart by a predetermined distance such that the tension of the separator is pulled with a tension uniformly generated from a tension controlling unit.

The separator moving member may include: a first side plate and a second side plate formed in predetermined shapes; a pair of upper guide rollers positioned at an upper portion of the separator moving member and configured to guide the separator; sliding long holes respectively formed on the first and second side plates such that the distance between the lower feeding rollers is capable of being controlled; the pair of lower feeding rollers mounted such that the pair of lower feeding rollers is capable of being moved along the sliding long holes; and a length changing means mounted on the sliding long holes and configured to control the distance between the pair of lower feeding rollers controlling the tension of the separator.

The length changing means may be coupled to roller shafts via bearings, may be configured to move the pair of lower feeding rollers mounted in the sliding long holes in opposite directions, and may be configured to move the pair of lower feeding rollers such that the pair of lower feeding rollers is in close contact to each other or is spaced apart from each other.

The length changing means may be mounted and moved on any one of the pair of the lower feeding rollers, and the other one of the pair of the lower feeding rollers may be formed of a fixed shaft that is configured to perform a simple rotation.

The length changing means may be formed of any one of a cylinder, a solenoid, and an LM guider.

A driving means feeding the pair of lower feeding rollers may be configured to be individually coupled to the pair of lower feeding rollers, thereby driving the pair of lower feeding rollers.

A driving means feeding the pair of lower feeding rollers may be configured to be selectively coupled to one of the pair of lower feeding rollers, and the other of the pair of lower feeding rollers may be a driven roller that does not have driving power.

The separator supplying member may include: a separator supplying unit configured to release the separator that is wound in a roll form; and the tension controlling unit mounted on a first side of the separator supplying unit such that the tension of the separator that is supplied to the separator moving member is controlled.

In addition, according to the present disclosure, there is provided a separator tension controlling method for stacking an electrode plate of a secondary battery, the method being configured to control a tension of a separator which is wound in a roll form and which surrounds the electrode plate alternately between a negative electrode plate and a positive electrode plate, and the method including: a process of stacking the separator with uniform tension by moving a separator moving member to a left side section; and a process of stacking the separator with the uniform tension by moving the separator moving member to a right side section.

The process of stacking the separator with the uniform tension by moving the separator moving member to the left side section may include: (a) supplying the separator to a position Ⓐ that is outward in an upper left direction of a stacked secondary battery by the separator moving member such that the negative electrode plate, the positive electrode plate, and the separator of the secondary battery are capable of being sequentially stacked, and moving and stopping the separator moving member; (b) separating a distance of a pair of lower feeding rollers from the position Ⓐ so that the tension of the separator is equal to a tension of a tension controlling unit that is positioned above the separator moving member, the pair of lower feeding rollers being in close contact with each other and being mounted on the separator moving member; (c) fixing the separator by pushing the separator with a mandrel; (d) stacking an A electrode plate (any one electrode plate among the negative electrode plate and the positive electrode plate) by normally positioning the A electrode plate on the separator; (e) narrowing the distance of the pair of lower feeding rollers of the separator moving member; and (f) moving and stopping the separator moving member to a position Ⓑ that is outward in an upper right direction of the stacked secondary battery from the position Ⓐ.

The process of stacking the separator with the uniform tension by moving the separator moving member to the right side section may include: (f) moving and stopping the separator moving member to a position Ⓑ that is outward in an upper right direction of a stacked secondary battery from a position Ⓐ; (g) separating a distance of a pair of lower feeding rollers from the position b so that the tension of the separator is equal to a tension of a tension controlling unit that is positioned above the separator moving member, the pair of lower feeding rollers being in close contact with each other and being mounted on the separator moving member; (h) fixing the separator by pushing the separator with a mandrel; (i) stacking a B electrode plate (any one electrode plate among the negative electrode plate and the positive electrode plate, not the electrode plate used as an A electrode plate) by normally positioning the B electrode plate on the separator; (j) narrowing the distance of the pair of lower feeding rollers of the separator moving member; and (k) supplying the separator to the position Ⓐ that is outward in the upper left direction of the stacked secondary battery from the position Ⓑ by the separator moving member, and moving and stopping the separator moving member.

The separator moving member may reciprocate between sections of Ⓐ and Ⓑ positions and may be moved while maintaining the tension of the separator not to be applied, and the tension of the separator may be pulled to be equal to the tension of the separator of a tension controlling unit that is positioned above the separator moving member while a distance between lower feeding rollers is spaced apart.

Lower feeding rollers of the separator moving member may include a pair of lower feeding rollers such that the separator is engaged and is in close contact with the pair of lower feeding rollers and the separator is capable of being moved in a horizontal direction by a horizontal movement of the separator moving member, the separator may be supplied more than a required length of the separator during horizontally moving the separator moving member such that the tension is not applied to the separator during moving the separator moving member, a distance between the pair of lower feeding rollers may be controlled by a length changing means mounted on each of the pair of lower feeding rollers, the separator may be pulled such that the tension of the separator is equal to the tension of the separator of a tension controlling unit positioned above the separator moving member while the distance between the lower feeding rollers is spaced apart from Ⓐ and Ⓑ positions that are outward in upper left and right directions of a stacked secondary battery so as to maintain the uniform tension, and the separator is stacked, thereby preventing reverse movement phenomenon of the separator.

A first feeding roller and a second feeding roller of the lower feeding rollers may be moved by 1 mm to 6 mm, so that the tension of the separator may be pulled to be equal to the tension of the separator of the tension controlling unit positioned above the lower feeding rollers.

In the process (c) and a process (h), the separator may be pushed at the position Ⓐ and the position Ⓑ by the mandrel so that the tension of the separator stacked between each mandrel is equal to the tension of the separator positioned above each mandrel, thereby stacking the stacked secondary battery with the uniform tension of the separator.

In the process (a) and the process (b), before the separator moving member supplies the separator to the position Ⓐ and the separator moving member moves and stops by reaching the position Ⓐ, separating the distance between the pair of lower feeding rollers from the position Ⓐ so that the tension of the separator in the process (b) is equal to the tension of the tension controlling unit positioned above the separator moving member may be performed, the pair of lower feeding rollers being in close contact with each other and being mounted on the separator moving member, or in the process (f) and a process (g), before the separator moving member supplies the separator to the position Ⓑ and the separator moving member moves and stops by reaching the position Ⓑ, separating the distance between the pair of lower feeding rollers from the position Ⓑ so that the tension of the separator in the process (g) is equal to the tension of the tension controlling unit positioned above the separator moving member may be performed, the pair of lower feeding rollers being in close contact with each other and being mounted on the separator moving member.

When the separator reciprocates the first position and the second position, the separator longer than a required length may be continuously supplied, so that the separator may be moved while the separator maintains a state in which the tension of the separator is not generated.

As described above, according to the separator tension controlling apparatus and the separator tension controlling method for stacking the electrode plate of the secondary battery of the present disclosure, there are effects that a dancer for directly controlling the tension of the separator is not require to be mounted, a weight of a moving member that moves the separator is capable of being reduced, the moving speed of the moving member may increase as the weight of the moving member is reduced, and operation time according to the stacking operation of the secondary battery may be significantly reduced by more rapidly moving the separator that is interposed between the electrode plates.

In addition, according to the separator tension controlling apparatus and the separator tension controlling method for stacking the electrode plate of the secondary battery of the present disclosure, there are effects that the separator may perform a reciprocating movement without the reverse movement phenomenon, the defect of the secondary battery according to the change in the tension of the separator may be reduced, productivity of the secondary battery may be increased, the separator may be stacked on the electrode plate with the constant tension by uniformly pulling the separator such that the tension of the separator becomes equal to the tension of the separator of the tension controlling unit positioned at the upper portion in order to prevent the reverse movement phenomenon of the separator during stacking the secondary battery, and the control of the tension of the separator may be easily performed.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 10 is a process diagram illustrating a separator tension controlling method for stacking an electrode plate of a secondary battery according to an exemplary embodiment of the present disclosure;

FIG. 11 is a conceptual view illustrating a position and a state of a separator at a left side moving section of the separator tension controlling method for stacking the electrode plate of the secondary battery according to an exemplary embodiment of the present disclosure;

FIG. 12 is a conceptual view illustrating a position and a state of a separator at a right side moving section of the separator tension controlling method for stacking the electrode plate of the secondary battery according to an exemplary embodiment of the present disclosure;

DETAILED DESCRIPTION OF THE INVENTION

Figures 1A, 1B:
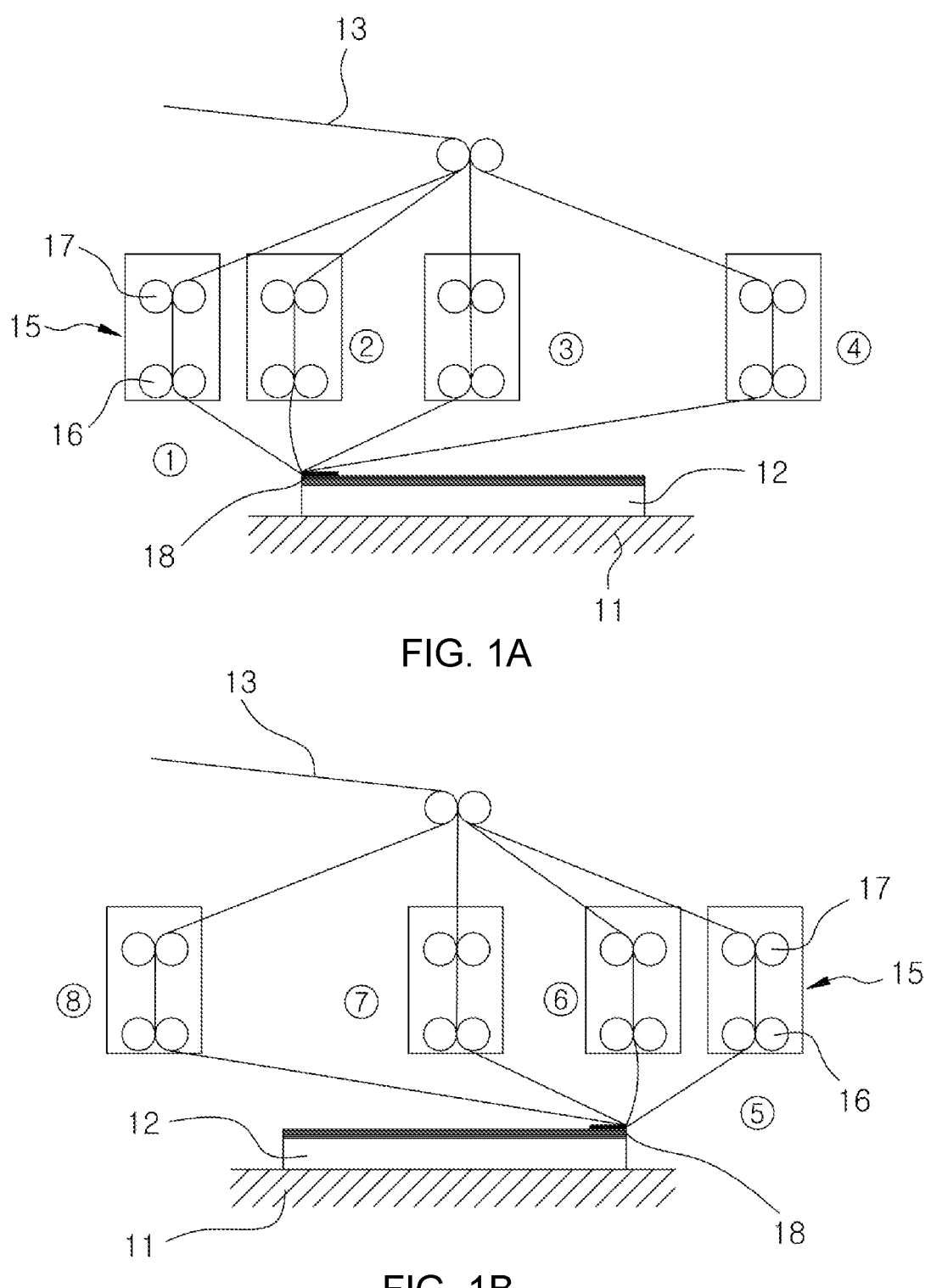
FIGS. 1A and 1B are views illustrating a configuration of an operation state of a conventional separator tension controlling apparatus for stacking an electrode plate of a secondary battery.
Figure 2A:
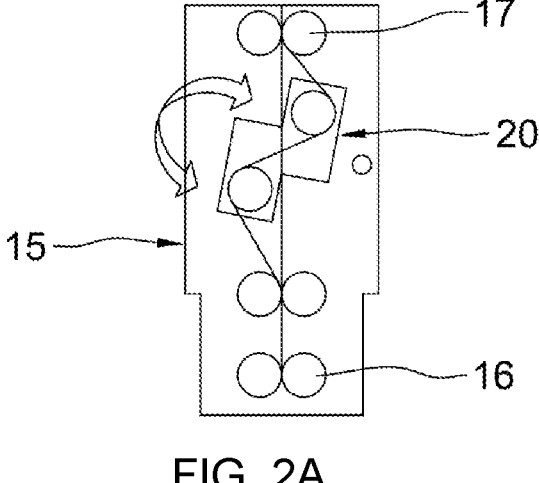
FIGS. 2A and 2B are views schematically illustrating a state in which a rotary dancer is mounted in the separator tension controlling apparatus for stacking the electrode plate of the secondary battery.
Figure 2B:
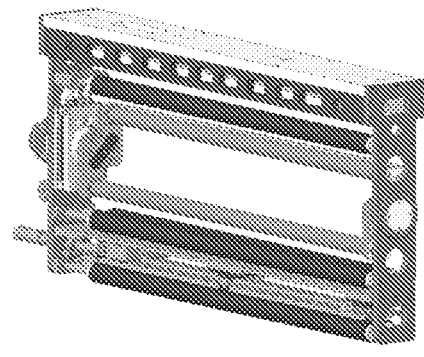

Hereinafter, embodiments of the present disclosure will be described in detail with reference to the accompanying drawings so that those skilled in the art can easily implement the present disclosure.

However, the description of the present disclosure is only an example for structural or functional explanation, and the scope of claims of the present disclosure should not be construed to be limited by the embodiment described in the specification.

For example, the embodiment according to the present disclosure may be changed variously and have various types, and thus it should be understood that it includes all equivalents to achieve a technical spirit within a scope of the present disclosure.

In addition, the objectives or effects presented in the present disclosure do not mean that a specific embodiment should include all thereof or only such effects, so the scope of the present disclosure should not be construed as being limited thereto.

In this specification, these embodiments are provided so that this disclosure will be thorough and complete, and will fully convey the scope of the disclosure to those skilled in the art. The present disclosure is only defined by the scope of the claims.

As such, in some embodiments, well known components, operations, and techniques are not specifically described to avoid an undesirable interpretation of the present disclosure.

Meanwhile, it is to be understood that the meaning of the terms described in the present disclosure is not limited to a dictionary meaning, and should be understood as follows.

Unless indicated otherwise, it is to be understood that all the terms used in the specification has the same meaning as those that are understood by those skilled in the art.

The terms commonly used and predefined terms should be interpreted to be consistent with the meanings in the context of the related art, and cannot be interpreted as having ideal or excessively formal meaning unless explicitly.

Hereinafter, a separator tension controlling apparatus for stacking an electrode plate of a secondary battery and a separator tension controlling method for stacking an electrode plate of a secondary battery, the apparatus and the method according to an exemplary embodiment of the present disclosure, will be described with reference to the accompanying drawings.

A separator tension controlling apparatus for stacking an electrode plate of a secondary battery according to an exemplary embodiment of the present disclosure includes a separator loading member 110 on which a fixing plate 114 is mounted such that a separator loading unit 112, a separator supplying member 130, and a separator moving member 150 which are mounted on an upper surface of a table 111 are capable of being mounted so that a negative electrode and a positive electrode of the secondary battery are capable of being stacked to cross each other by a separator 132. Furthermore, the separator tension controlling apparatus includes the separator supplying member 130 mounted on a first side of the separator loading unit 112 such that the separator 132 is capable of being supplied to the separator loading unit 112, and includes the separator moving member 150 mounted on an upper side of the separator loading member 110 such that the separator 132 supplied from the separator supplying member 130 is capable of being supplied with uniform tension.

The separator moving member 150 is moved to a position (a) that is positioned at a left side, an upper portion, and an outer side of a stacked secondary battery 116 such that the separator moving member 150 is capable of controlling a tension of the separator 132. Furthermore, in order to pull the separator 132 such that the tension of the separator 132 becomes equal to a tension of a separator of a tension controlling unit 141 at an upper portion of the separator moving member 150, a pair of lower feeding rollers 160 mounted on the separator moving member 150 is spaced apart.

Figure 3:
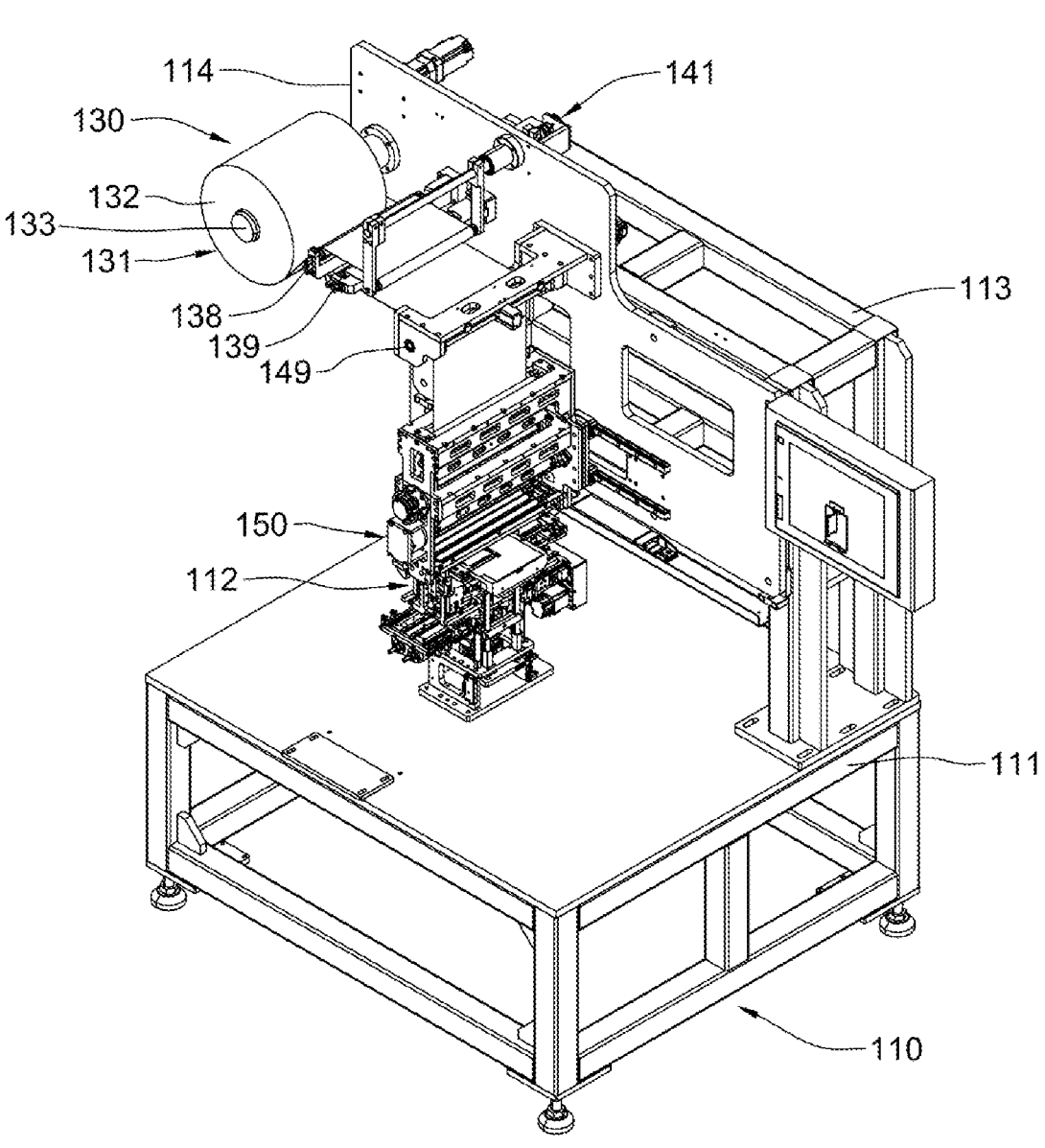
FIG. 3 is a three-dimensional view illustrating a separator tension controlling apparatus for stacking an electrode plate of a secondary battery according to an exemplary embodiment of the present disclosure.
Figure 4:
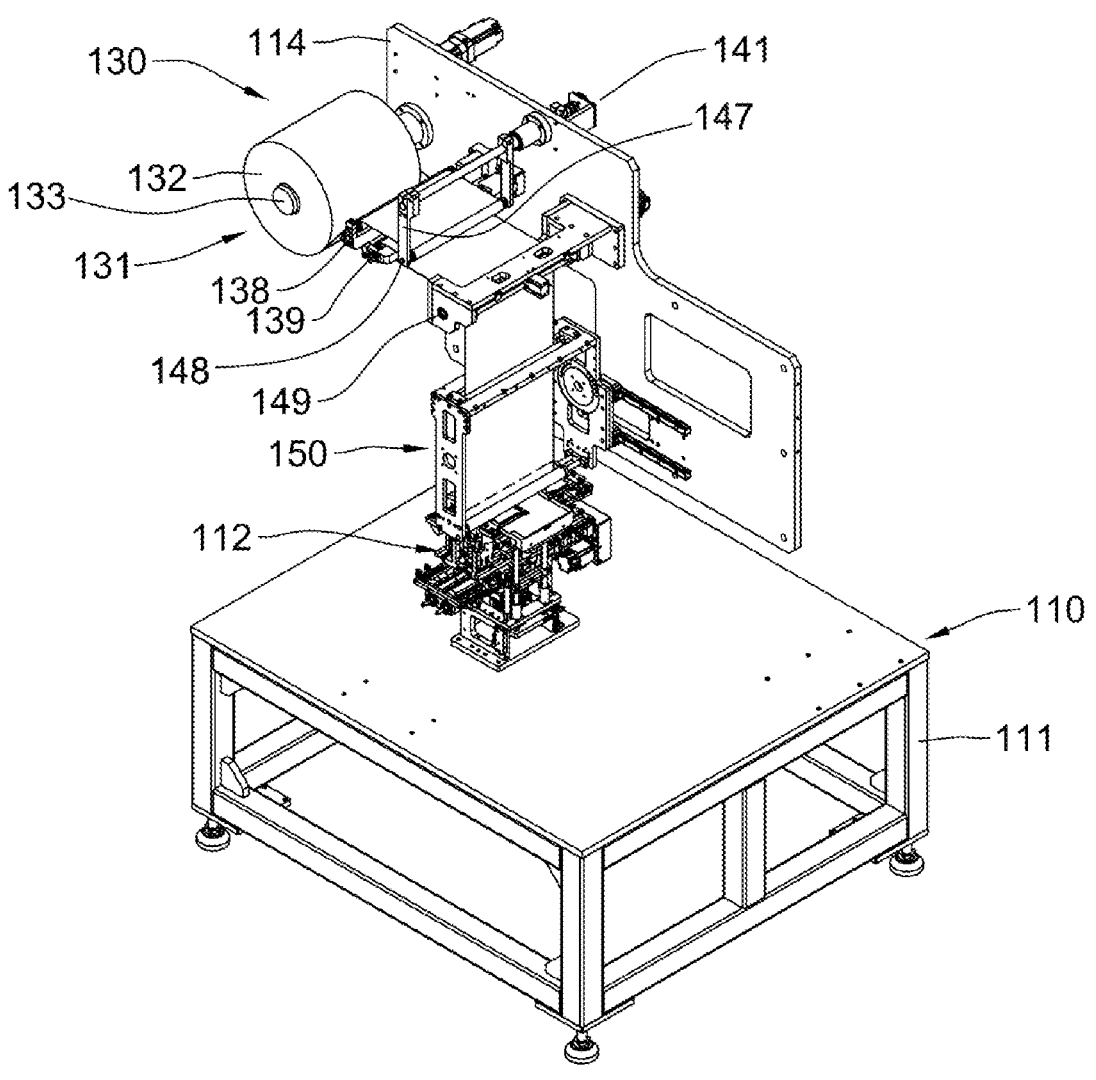
FIG. 4 is a three-dimensional view illustrating the separator tension controlling apparatus for stacking the electrode plate of the secondary battery according to an exemplary embodiment of the present disclosure.
Figure 5:
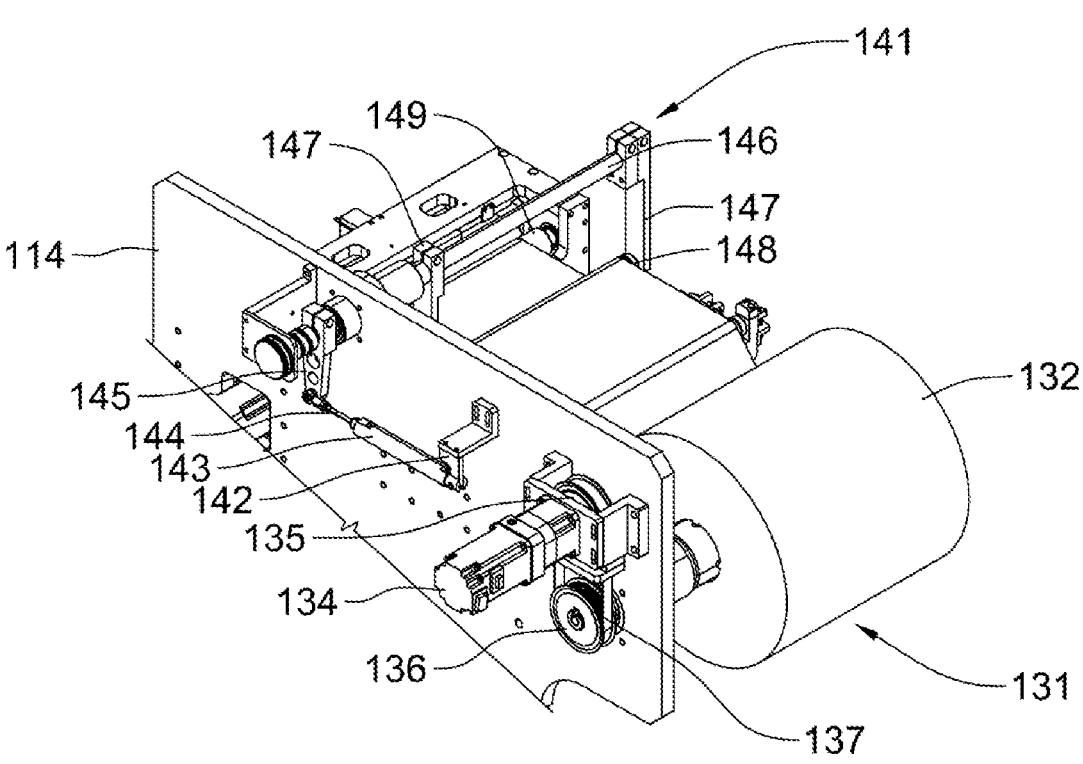
FIG. 5 is a three-dimensional view illustrating the separator tension controlling apparatus for stacking the electrode plate of the secondary battery according to an exemplary embodiment of the present disclosure.
Figure 6:
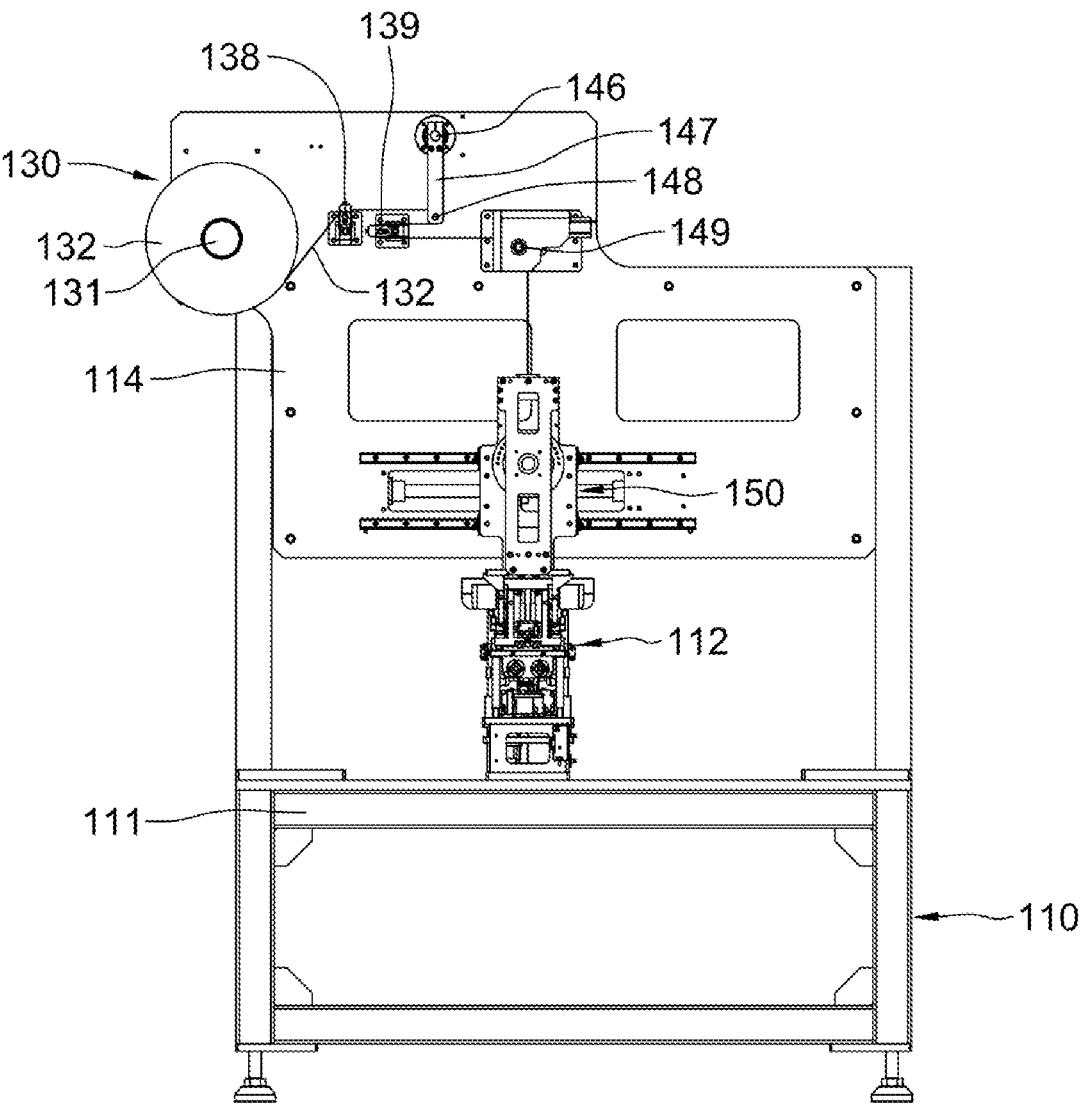
FIG. 6 is a front view illustrating the separator tension controlling apparatus for stacking the electrode plate of the secondary battery according to an exemplary embodiment of the present disclosure.

FIG. 3 is a three-dimensional view illustrating a separator tension controlling apparatus for stacking an electrode plate of a secondary battery according to an exemplary embodiment of the present disclosure, FIG. 4 is a three-dimensional view illustrating the separator tension controlling apparatus for stacking the electrode plate of the secondary battery according to an exemplary embodiment of the present disclosure, FIG. 5 is a three-dimensional view illustrating the separator tension controlling apparatus for stacking the electrode plate of the secondary battery according to an exemplary embodiment of the present disclosure, and FIG. 6 is a front view illustrating the separator tension controlling apparatus for stacking the electrode plate of the secondary battery according to an exemplary embodiment of the present disclosure.

As illustrated FIGS. 3 to 6, the table 111 is mounted on the separator moving member 110 of the separator tension controlling apparatus according to an embodiment of the present disclosure. Furthermore, on the upper surface of the table 111, the stacked secondary battery 116 is mounted such that a negative electrode plate, the separator 132, a positive electrode plate, the separator 132 are capable of being sequentially and continuously stacked.

The stacked secondary battery 116 is formed by sequentially and continuously stacking the negative electrode plate, the separator 132, the positive electrode plate, and the separator 132, and a detailed description of the stacked secondary battery 116 will be omitted.

A fixing frame 113 is mounted on a first side of the upper surface of the table 111, and the fixing plate 114 is mounted on the fixing frame 113 so as to mount the separator supplying member 130.

Figure 8:
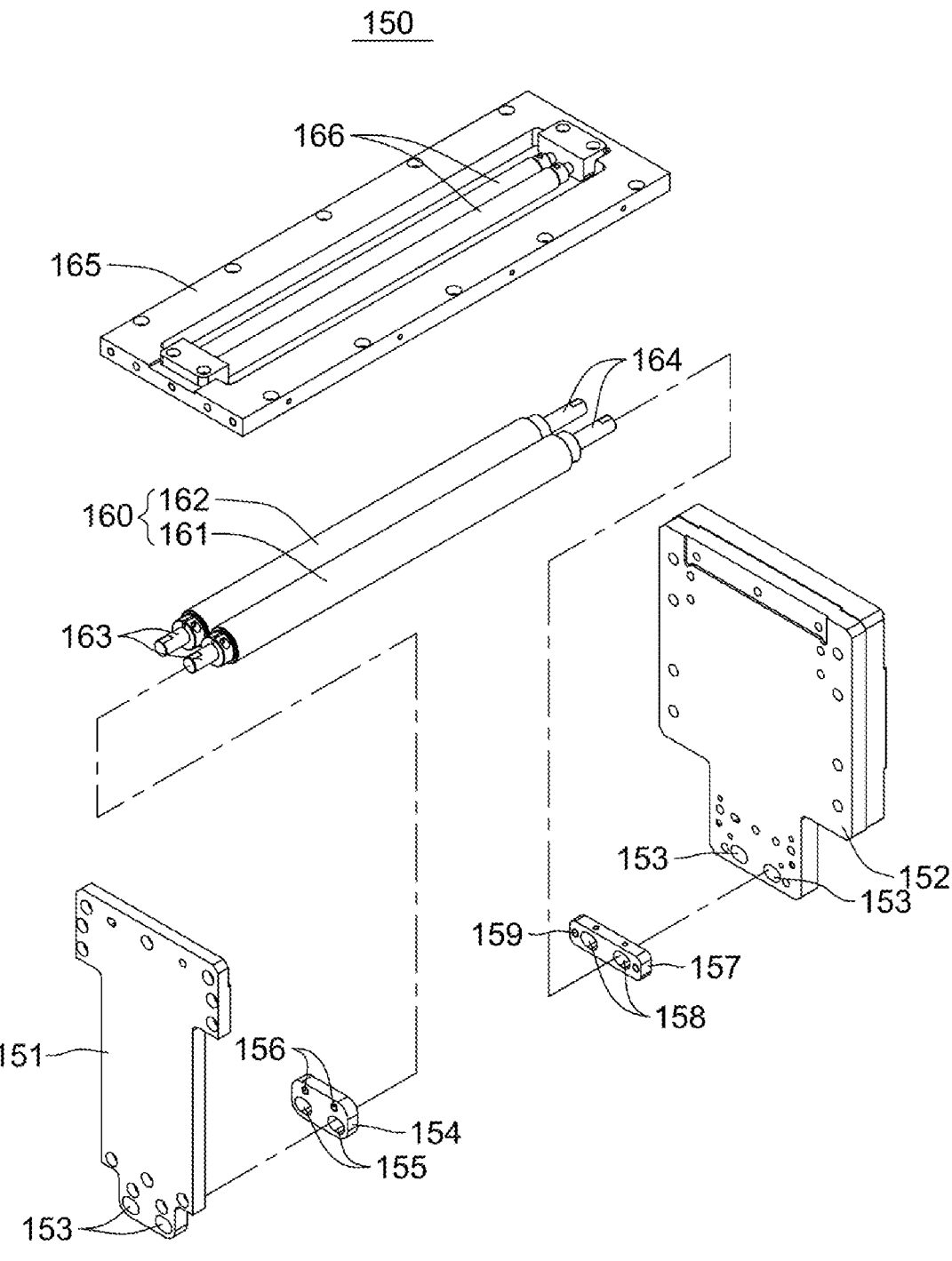
FIG. 8 is an exploded three-dimensional view illustrating the separator moving member of the separator tension controlling apparatus for stacking the electrode plate of the secondary battery according to an exemplary embodiment of the present disclosure.
Figure 9:
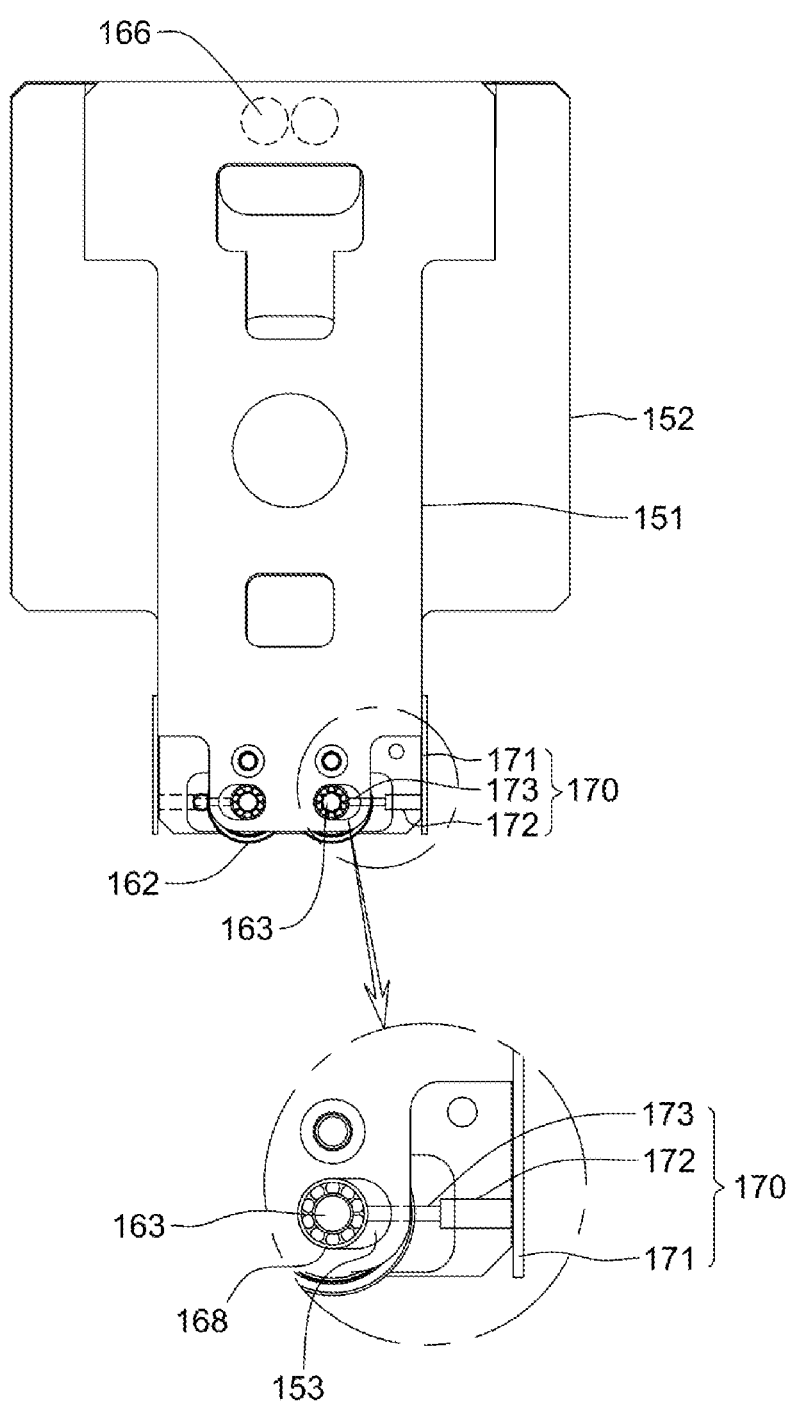
FIG. 9 is a front view illustrating a state in which lower feeding rollers of the separator tension controlling apparatus for stacking the electrode plate of the secondary battery according to an exemplary embodiment of the present disclosure are spaced apart from each other.

FIG. 8 is a fragmentary and enlarged three-dimensional view illustrating a separator supplying member of the separator tension controlling apparatus for stacking the electrode plate of the secondary battery according to an exemplary embodiment of the present disclosure, and FIG. 9 is a three-dimensional view illustrating the separator supplying member of the separator tension controlling apparatus for stacking the electrode plate of the secondary battery according to an exemplary embodiment of the present disclosure.

As illustrated in FIGS. 6 to 9, the separator supplying member 130 is mounted on the fixing frame 114, and a separator supplying unit 131 supplying the separator 132 and the tension controlling unit 141 for moving and supplying the separator 132 with uniform tension are mounted on the separator supplying member 130.

The separator supplying member 130 includes the separator supplying unit 131 configured to release the separator 132 that is wound in a roll form, and includes the tension controlling unit 141 mounted on a first side of the separator supplying unit 131 such that the tension of the separator 132 that is supplied to the separator moving member 150 is controlled.

The separator supplying unit 131 is configured to continuously supply the separator 132, and the tension controlling unit 141 is configured to control the tension of the separator 132 to be uniform so that a state in which the separator 132 that is supplied to the separator moving member 150 is tensely strained is maintained.

The separator supplying unit 131 includes the separator 132 that wound in the roll form, an air shaft 133 rotatably mounted on the fixing plate 114 such that a roll of the separator 132 is capable of being attached to and detached from the air shaft 133, a driving motor 134 mounted on a first side of the air shaft 133 and configured to rotate the air shaft 133 at a constant speed, a driving pulley 135 configured to transmit a rotational force of the driving motor 134, a driven pulley 136 configured to receive the rotational force of the driving pulley 135, and a first guide roller 138 and a second guide roller 139 mounted to be spaced apart from the air shaft 133 and configured to guide a movement of the separator 132 that is released from the roll of the separator 132.

The roll of the separator 132 wound in the roll form (otherwise, a scroll form) is mounted on the separator supplying unit 131, and the air shaft 133 is mounted on the fixing plate 114 so as to hang the roll of the separator 132.

The driving motor 134 is mounted on the fixing plate 114 such that the air shaft 133 is capable of being rotated in the constant speed, the driving pulley 135 configured to transmit the rotational force is mounted on the driving motor 134, and the driven pulley 136 is rotatably coupled to a lower portion of the driving pulley 135.

A belt 137 configured to transmit the rotational force is mounted between the driving pulley 135 and the driven pulley 136, and the air shaft 133 is rotated in the constant speed by the driven pulley 136.

Therefore, the separator 132 in the roll form mounted on the air shaft 133 is released at the constant speed.

Furthermore, at the first side of the air shaft 133, the first guide roller 138 and the second guide roller 139 are mounted to be spaced apart from each other by a predetermined distance such that the separator 132 is capable of being moved while the separator 132 is in the tensely strained state.

In this manner, while the separator 132 released from the air shaft 133 passes through the first guide roller 138, the tension controlling unit 141, and the second guide roller 139, the separator 132 is supplied with a tension that is previously set up from the tension controlling unit 141.

Meanwhile, the tension controlling unit 141 is configured to control a tension of the separator 132, and is configured to vary a position of a rotation roller 148 by a rotation of a rotation bracket 147 that is connected to a rotary shaft 146 of the tension controlling unit 141, thereby being capable of controlling a tension of the separator 132 to be the tension previously set up from the tension controlling unit 141 by pulling or releasing the separator 132.

The tension controlling unit 141 includes a fixing bracket 142 mounted on the fixing plate 114, a cylinder 143 rotatably mounted on the fixing bracket 142, a piston 144 retractably mounted in the cylinder 143, a rotary rod 145 mounted such that the rotary rod 145 is capable of being rotated by a protrusion and retraction of the piston 143, the rotary shaft 146 mounted on the fixing plate 114 such that the rotary shaft 146 is capable of being rotated by the rotary rod 145, the pair of rotation brackets 147 mounted on the rotary shaft 146, and the rotation roller 148 rotatably mounted on the pair of rotation brackets 147.

The fixing bracket 142 is mounted on a first surface of the fixing plate 114 such that the cylinder 143 is capable of being mounted on the fixing bracket 142, and the cylinder 143 is rotatably mounted on the fixing bracket 142.

The piston 144 having a variable length is coupled to the cylinder 143, the rotary rod 145 is coupled to the piston 144, and the rotation of the rotary rod 145 is realized by the protrusion and retraction of the piston.

The rotary shaft 146 is mounted on the rotary rod 145, and the pair of rotation brackets 147 is mounted on respective both sides of the rotary shaft 146.

The rotation roller 148 is rotatably mounted between the pair of rotation brackets 147, and the separator 132 sequentially passes through the first guide roller 138, the rotation roller 148, and the second guide roller 139.

That is, as the piston 144 rotates the rotary rod 145 and the rotary rod 145 rotates the rotary shaft 146, the position of the rotation roller 148 which is coupled to ends of the rotation brackets 147 that are connected to the rotary shaft 146 and which is rotated is changed, so that the separator 132 is pulled or released, thereby controlling the tension.

As illustrated in FIG. 6, when the rotation roller 148 is moved to a right side in the drawing, the roll of the separator 132 is continuously released and supplied. However, when the tension applied to the separator 132 is small, a length of the separator 132 increases, and the separator 132 is pulled, so that the tension increases and the separator 132 is strained.

On the other hand, when the rotation roller 148 is moved to a left side in the drawing, a length of the separator 132 is reduced, and the tension of the separator 132 is reduced and a loose tension state is maintained. Furthermore, by setting a tension to be a predetermined tension previously set up from the tension controlling unit 141, the separator 132 is pulled or released by the rotation of the rotation roller 148, and the tension of the separator 132 is controlled to the predetermined tension, so that the tension applied to the separator 132 that is stacked is capable of being controlled uniformly.

A third guide roller 149 is mounted on a first side of the tension controlling unit 141. Furthermore, on the third guide roller 149, the separator 132 is supplied from an upper side of the separator moving member 150.

Figure 7:
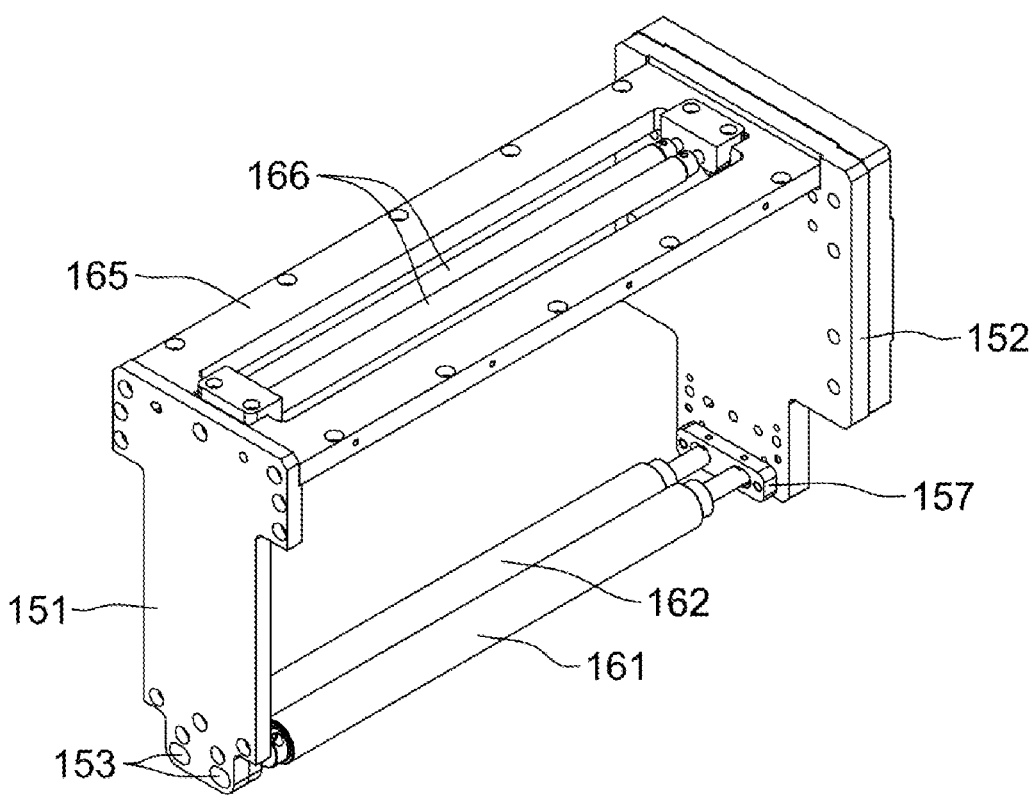
FIG. 7 is a three-dimensional view illustrating a separator moving member of the separator tension controlling apparatus for stacking the electrode plate of the secondary battery according to an exemplary embodiment of the present disclosure.

FIG. 7 is a three-dimensional view illustrating the separator moving member 150 of the separator tension controlling apparatus for stacking the electrode plate of the secondary battery according to an exemplary embodiment of the present disclosure, FIG. 8 is an exploded three-dimensional view illustrating the separator moving member 150 of the separator tension controlling apparatus for stacking the electrode plate of the secondary battery according to an exemplary embodiment of the present disclosure, and FIG. 9 is a front view illustrating a state in which the lower feeding rollers 160 of the separator tension controlling apparatus for stacking the electrode plate of the secondary battery according to an exemplary embodiment of the present disclosure are spaced apart.

The separator moving member 150 includes a first side plate 151 and a second side plate 152 formed in predetermined shapes, sliding long holes 153 respectively formed on the first and second side plates 151 and 152 such that a distance between the lower feeding rollers 160 is capable of being controlled, the pair of lower feeding rollers 160 mounted such that the pair of lower feeding rollers 160 is capable of being moved along the sliding long holes 153, and a length changing means 170 configured to control a tension of the separator 132 to be the uniform tension by moving the lower feeding rollers 160 mounted on the sliding long holes 153.

As illustrated in FIGS. 7 to 9, it is preferable to minimize a weight of the separator moving member 150 so that the movement of the separator 132 and the stacking of the stacked secondary battery 116 are more rapidly performed.

To this end, the separator moving member 150 includes the pair of side plates 151 and 152, the pair of lower feeding rollers 160 mounted on the lower portions of the pair of side plates 151 and 152, and upper guide rollers 166 mounted on upper portions of the pair of side plates 151 and 152.

All guide rollers including the upper guide rollers 166 are configured to guide the separator 132. Therefore, when the separator 132 is pulled in any one direction, the guide rollers is rotated to guide the separator 132. That is, the guide rollers are mounted to be spaced apart from each other so that no frictional force acts when the separator 132 passes through the facing guide rollers.

The lower portions of the pair of side plates 151 and 152 are provided with the sliding long holes 153 such that the lower feeding rollers (a first feeding roller and a second feeding roller) 161 and 162 are capable of being slid.

The sliding long holes 153 are formed of predetermined lengths such that the distance between the lower feeding rollers 161 and 162 are capable of being spaced apart from each other.

In addition, inner sides of the pair of side plates 151 and 152 are provided with a first bracket 154 and a second bracket 157 such that the first feeding roller 161 and the second feeding roller 162 that are the lower feeding rollers 160 are capable of being more stably mounted.

The brackets 154 and 157 allow the lower feeding rollers 161 and 162 to be more stably mounted, and the first bracket 154 is mounted so as to more stably mount the lower feeding rollers 161 and 162.

In addition, the second bracket 157 is mounted so as to more stably mount the lower feeding rollers 161 and 162.

First bracket long holes 155 are formed in the first bracket 154 such that roller shafts (a first roller shaft and a second roller shaft) 163 and 164 of the first feeding roller 161 and the second feeding roller 162 are capable of being slid, and second bracket long holes 158 are formed in the second bracket 157 such that the roller shafts 163 and 164 of the first feeding roller 161 and the second feeding roller 162 are capable of being slid.

In addition, first bolt holes 156 are formed in the first bracket 154 such that the first bracket 154 is capable of being mounted on the first side plate 151, and second bolt holes 159 are formed in the second bracket 157 such that the second bracket 157 is capable of being mounted on the second side plate 152.

Fixing bolts (not illustrated) are fastened into the first bolt holes 156 and the second bolt holes 159, and the first bracket 154 and the second bracket 157 are respectively mounted on first surfaces of the first side plate 151 and the second side plate 152 by the fixing bolts.

The lower feeding rollers 160 are mounted on the sliding long holes 153 of the first side plates 151 and the second side plate 152, and is mounted between the first side plate 151 and the second side plate 152.

The first roller shafts 163 are formed on first sides of the feeding rollers 161 and 162 such that the first roller shafts 163 are capable of being coupled to the brackets 154 and 157 and to the side plates 151 and 152, The second roller shafts 164 are formed on second sides of the feeding rollers 161 and 162 such that the second roller shafts 164 are capable of being coupled to the brackets 154 and 157 and to the side plates 151 and 152.

In addition, an upper roller bracket 165 is mounted on the upper portions of the side plates 151 and 152 such that the upper guide rollers 166 are capable of being mounted on in the upper roller bracket 165, and the pair of upper guide rollers 166 is engaged and mounted in the upper roller bracket 165.

All guide rollers including the upper guide rollers 166 are configured to guide the separator 132. Therefore, when the separator 132 is pulled in any one direction, the guide rollers is rotated to guide the separator 132. That is, the guide rollers are mounted to be spaced apart from each other so that no frictional force acts when the separator 132 passes through the facing guide rollers.

At this time, feeding roller driving motors 190 that are not illustrated are respectively mounted on the feeding rollers 161 and 162, thereby driving the feeding rollers 161 and 162.

FIG. 9 is a front view schematically illustrating the length changing means 170 according to an embodiment of the present disclosure, and a cylinder 172 that constitutes the length changing means 170 is illustrated.

The distance between the first feeding roller 161 and the second feeding roller 162 is controlled since a predetermined pressure is applied or released by the length changing means 170, and the length changing means 170 is spaced apart by a cylinder mounted on the side plates 151 and 152.

Fixing brackets 171 are mounted on the side plates 151 and 152, and the cylinders 172 are mounted on the fixing brackets 171, and the pistons 173 coupled to the cylinders 172 are connected to and mounted on outer sides of the roller shafts 163 and 164 via respective bearings 168.

Meanwhile, as another embodiment, the length changing means 170 may be formed of a solenoid (not illustrated) that is controlled by an electrical signal. The solenoid may be mounted between the fixing bracket 171 and the bearings 168 respectively mounted on the outer sides of the roller shafts 163 and 164, so that the solenoid may control the distance between the first feeding roller 161 and the second feeding roller 162.

As still another embodiment, the feeding motor driving motors 190 that are not illustrated are coupled to the feeding rollers 161 and 162 and are configured to be respectively driven, but it is advantageous to increase the moving speed when the weight of the separator moving member 150 is small since the feeding motor driving motors 190 are driven in a direction realizing a faster stacking speed in order to increase a manufacturing speed of the stacked secondary battery 116. Therefore, any one of the feeding rollers 161 and 162 may be driven, the other one of the feeding rollers 161 and 162 may be used as a free rotating roller so that the number of the driving motors 190 is reduced, configurations of a cylinder, a solenoid, and an LM guider may be used as a driving means that separates and contacts the distance between the first feeding roller 161 and the second feeding roller 162, the first feeding roller 161 and the second feeding roller 162 may be individually driven, one feeding roller may be fixed so as to reduce the weight of the separator moving member 150, and the other feeding roller may only be driven so as to separate and contact the distance.

A separator tension controlling method for stacking a secondary battery according to an embodiment of the present disclosure will be described with reference to FIGS. 10 to 12, in which FIG. 10 is a process diagram illustrating a separator tension controlling method for stacking an electrode plate of a secondary battery according to an exemplary embodiment of the present disclosure.

The separator tension controlling method for stacking the secondary battery according to an embodiment of the present disclosure is a method of controlling a tension of the separator that surrounds electrode plates by being alternately stacked between the negative electrode plate and the positive electrode plate, the separator being wound in the roll form. Furthermore, the method is divided into two sections that are a section moving to the left side and a section moving to the right side, and the method will be clearly described.

The section moving to the left side includes six processes from an (a) process to an (f) process, and the section moving to the right side includes six processes from the (f) process to a (k) process.

In the (a) process, a process in which feeding is performed outward in an upper left direction of the stacked secondary battery 116 such that the negative electrode plate, the positive electrode plate, and the separator are sequentially stacked and then the separator moving member 150 is stopped on the position ⓐ after the separator moving member 150 is moved S10 is illustrated.

In a state in which the separator 132 is wound on the separator supplying unit 131 in the roll (scroll) form, the separator 132 passes through the tension controlling unit 141 of the separator supplying member 130 and moves to the position ⓐ that is outward in the upper left direction of the stacked secondary battery 116, and is continuously supplied through the lower feeding rollers 161 and 162.

The separator 132 moved to the separator moving member 150 passes through the upper guide rollers 166 and is moved to the lower feeding rollers 160, and the separator 132 is moved while being engaged between the upper guide rollers 166 and the lower feeding rollers 160.

At this time, all guide rollers including the upper guide rollers 166 are configured to guide the separator 132. Therefore, when the separator 132 is pulled in any one direction, the guide rollers is rotated to guide the separator 132. That is, the guide rollers are mounted to be spaced apart from each other so that no frictional force acts when the separator 132 passes through the facing guide rollers.

The separator moving member 150 includes electrode plates (a negative electrode plate and a positive electrode plate. In order for the separator 132 to be interposed between the electrode plates, the separator moving member 150 is moved in the left side in the drawings, and the separator 132 is moved to a left side of the electrode plates with almost no tension.

At this time, the separator 132 is released at the constant speed by the air shaft 133 that is rotated by the driving motor 134.

The separator moving member 150 is moved to the position ⓐ of the electrode plates. At this time, as the separator 132 is supplied with the constant speed by the separator supplying unit 131, the separator 132 is supplied with a not strained state. That is, the separator is in an almost no tension state.

In a state in which the separator moving member 150 is moved to the position (a), since the separator 132 is supplied with the constant speed, the tension of the separator 132 is almost non-existent. Expressing this numerically, the separator 132 is supplied while the tension of the separator is in a state close to '0'.

In the (b) process, in a state in which the separator moving member 150 is stopped to the position (a) that is outward in the upper left direction of the stacked secondary battery 116, the distance between the lower feeding rollers 161 and 162 extends through the length changing means 170 so that the tension not applied to the separator 132 is applied with the uniform and the same tension as the tension formed in the tension controlling unit 141 S20. Furthermore, the cylinder 172, the solenoid, the LM guider, or the like may be used as the length changing means 170.

The distance between the first feeding roller 161 and the second feeding roller 162 of the lower feeding rollers 160 is splayed by the cylinder 172 that is the length changing means 170 while the lower feeding rollers 160 are in close contact to the separator 132.

The cylinder 172 or the solenoid that is the length changing means 170 may move the distance between the first feeding roller 161 and the second feeding roller 162 at 1 mm to 6 mm, and the splaying distance between the first feeding roller 161 and the second feeding roller 162 may be increased or decreased.

In this manner, the reason for splaying the distance between the first feeding roller 161 and the second feeding roller 162 is to secure a length of the separator 132 as the separator 132 is pulled and the tension of the separator 132 is constantly increased when the separator 132 is pushed by a mandrel 180-1, and is to apply the same and uniform tension as the constant tension formed in the tension controlling unit 141 to the separator 132 previously not having the tension.

That is, the separator 132 is pushed by the mandrel 180-1 in order to be placed on an upper surface of an electrode plate. At this time, the separator 132 is pulled to a predetermined length.

In addition, as necessary, in the (a) process and the (b) process, before the separator moving member 150 supplies the separator to the position (a) and the separator moving member 150 arrives the position (a) and stops, the (b) process in which the distance between the pair of lower feeding rollers 160 which is in contact with each other and which is mounted on the separator moving member 150 is spaced apart from each other in the position (a) so that the tension of the separator is equal to the tension of the tension controlling unit 141 positioned above the separator moving member 150 may be performed at the same time, thereby being capable of reducing working time.

In the (c) process, in a state in which the separator moving member 150 is stopped at the position that is outward in the upper left direction of the stacked secondary battery 116 and the distance between the lower feeding rollers 161 and 162 extends through the length changing means 170 such that the tension that is uniform and same as the tension formed in the tension controlling unit 141 is applied to the separator 132, the mandrel 180-1 at the left side pushes the separator 132, and the separator is fixed in a shape that covers the electrode plate in a lower position from above S30. Specifically, in a situation in which the separator 132 is positioned at a position of a separator 132a that is pulled with the same tension as the tension formed in the tension controlling unit 141, when the separator 132 is moved from a position of a mandrel 180-1a to a position of a mandrel 180-1b, the position of the separator 132 is changed to a position of a separator 132b. Furthermore, when the separator 132 is moved further downward from the position of the mandrel 180-1b and moved downward to a position of the mandrel 180-1, an operation of pushing and fixing the separator 132 by moving the mandrel 180-1 to a position of a separator 132c is completed.

The reason for splaying the distance between the first feeding roller 161 and the second feeding roller 162 is to secure a length of the separator 132 as the separator 132 is pulled and the tension of the separator 132 is constantly increased when the separator 132 is pushed by a mandrel 180-1, and is to apply the same and uniform tension as the constant tension formed in the tension controlling unit 141 to the separator 132 previously not having the tension.

That is, the separator 132 is pushed by the mandrel 180-1 in order to be placed on an upper surface of an electrode plate. At this time, the separator 132 is pulled to a predetermined length.

In a state in which a first end of the separator 132a is pushed by the mandrel 180-2 and the separator moving member 150 is stopped at the position (a) that is outward in the upper left direction of the stacked secondary battery 116, the length of the separator 132a maintains a length shorter than lengths of the separators 132b and 132c.

As the mandrel 180-1a pushes the separator 132a, the length of the separator 132a is changed to a state in which a longer length is required, and the required length longer than the length of the separator 132a is supplied with uniform tension from the tension controlling unit 141 positioned above the separator moving member 150.

In this manner, as the separator 132a is changed to the separator 132b, the separator 132 which is in a loose state and which is positioned above the electrode plate is momentarily changed to a tensioned state, but the separator 132 soon maintains the constant tension by supplying the separator 132 from the tension controlling unit 141.

Accordingly, the separator 132 between the mandrel 180-2 of the stacked secondary battery 116 and the feeding rollers 161 and 162 maintains the constant tension.

In addition, the separator 132b is pushed onto the upper surface of the electrode plate by the mandrel 180-1b. At this time, the separator 132c is change to a state in which the separator 132c has the longest length.

As the mandrel 180-1 pushes the separator 132c onto the upper surface of the electrode plate, the separator 132c between the mandrel 180-2 and the first feeding roller 161 is pulled, and the tension of the separator 132 momentarily increases. However, since the separator 132 with the constant tension is supplied from the tension controlling unit 141 positioned at the upper portion, the tension becomes uniform, and the separator 132c is in close contact with the upper surface of the electrode plate.

In this manner, the tension of the separator 132 between the mandrel 180-2 and the first feeding roller 161 is constantly maintained.

In addition, when the adhesion of the separator 132 is completed by the mandrel 180-1, an electrode plate 200 is positioned and the distance between the lower feeding rollers 161 and 162 is reduced and the lower feeding rollers 161 and 162 are in contact with each other, and the separator moving member 150 is prepared to be moved to the right side of the stacked secondary battery 116.

The (d) process is a process in which one electrode plate 200 is stacked and positioned on the separator 132 after the process of pushing and fixing the separator 132 by the mandrel 180-1 S40.

The electrode plates to be positioned are marked with A and B electrode plates, and the B electrode plate is a positive electrode plate when the A electrode plate is a negative electrode plate, and the negative electrode plate and the positive electrode plate are sequentially stacked one by one by crossing each other.

At this time, a size of the electrode plate that is stacked has a width slightly smaller (usually 1 mm to 3 mm) than a size of the separator 132 that is coated.

The (e) process is a process in which the distance between the pair of lower feeding rollers 160 is reduced and the pair of lower feeding rollers 160 is in contact with each other so that the separator moving member 150 can move the separator to a position ⓑ that is in the right side direction of the stacked secondary battery 116 S50. Furthermore, the tension applied to the separator 132 is the same pulled tension generated in the tension controlling unit 141.

The distance between the first feeding roller 161 and the second feeding roller 162 is narrowed so that the separator 132 can be brought into close contact with the first and second feeding rollers 161 and 162 by the cylinder 172 that is the length changing means 170.

The first feeding roller 161 and the second feeding roller 162 that are in close contact with each other start to supply the separator 132.

In the (f) process, in a state in which the separator moving member 150 is stopped at the position ⓑ that is outward in the upper right direction of the stacked secondary battery 116, after the process of reducing the distance of the pair of lower feeding rollers 160 and contacting the pair of lower feeding rollers 160 to each other ends, the pair of lower feeding rollers 160 is operated and the separator 132 having a required length is supplied downward, and the required length is supplied to a length enough not to generate a tension when the separator 132 is pulled while the separator moving member 150 is stopped at the position ⓑ that is outward in the upper right direction of the stacked secondary battery 116 S60.

In this manner, the separator moving member 150 is moved from the left side to the right side in the drawing. That is, the separator moving member 150 is moved from the position ⓐ to the position ⓑ.

Since the first feeding roller 161 and the second feeding roller 162 that are in close contact with each other continuously supply the separator 132, the tension of the separator 132 is loosened again as the separator moving member 150 moves to the right side.

That is, when the separator 132 is supplied 1 mm to 5 mm longer than a length of a straight line connecting the lower feeding rollers 160 at the position ⓑ from the position of the mandrel 180-1 at the left side, no tension is applied to the separator 132 while the separator moving member 150 is moved to the position ⓑ from the position ⓐ, so that It is a very important requirement to improve the quality of the stacked secondary battery 116 by preventing a change in tension from the separator 132 that is already stacked or to be stacked.

Thus, the section moving to the left side is described. Furthermore, the section moving to the right side will be described with reference to FIG. 12, in which FIG. 12 is a conceptual view illustrating a state of change in a length of the separator by the right side moving section of the separator tension controlling method for stacking the electrode plate of the secondary battery according to an exemplary embodiment of the present disclosure.

The (f) process is a process in which the separator moving member 150 moves and stops to the position ⓑ that is outward in the upper right direction of the stacked secondary battery 116 while the lower feeding rollers 161 and 162 are continuously supplying the separator 132 S60. Furthermore, the separator 132 is provided with a sufficient length of the separator 132 so that no tension is generated, and no tension is applied.

In the (g) process, in a state in which the separator moving member 150 is stopped to the position ⓑ that is outward in the upper right direction of the stacked secondary battery 116, the distance between the lower feeding rollers 161 and 162 extends through the length changing means 170 so that the tension not applied to the separator 132 is applied with the uniform and the same tension as the tension formed in the tension controlling unit 141 S70. Furthermore, the cylinder 172, the solenoid, the LM guider, or the like may be used as the length changing means 170.

In addition, as another embodiment, in the (f) process, before the separator moving member 150 supplies the separator to the position ⓑ and the separator moving member 150 arrives the position ⓑ and stops, the (g) process in which the distance between the pair of lower feeding rollers 160 which is in contact with each other and which is mounted on the separator moving member 150 is spaced apart from each other in the position ⓑ so that the tension of the separator is equal to the tension of the tension controlling unit 141 positioned above the separator moving member 150 may be performed at the same time, thereby being capable of increasing productivity by reducing working time.

In the (h) process, in a state in which the separator moving member 150 is stopped at the position ⓑ that is outward in the upper right direction of the stacked secondary battery 116 and the distance between the lower feeding rollers 161 and 162 extends through the length changing means 170 such that the tension that is uniform and same as the tension formed in the tension controlling unit 141 is applied to the separator 132, the mandrel 180-2 at the right side pushes the separator 132, and the separator is fixed in a shape that covers the electrode plate in a lower position from above S80. Specifically, in a situation in which the separator 132 is positioned at a position of a separator 132a that is pulled with the same tension as the tension formed in the tension controlling unit 141, when the separator 132 is moved from the position of the mandrel 180-2a to the position of the mandrel 180-2b, the position of the separator 132 is changed to the position of a separator 132b. Furthermore, when the separator 132 is moved further downward from the position of the mandrel 180-2b and moved downward to the position of the mandrel 180-2, an operation of pushing and fixing the separator 132 by moving the mandrel 180-2 to the position of a separator 132c is completed.

The (i) process is a process in which one electrode plate 200 is stacked and positioned on the separator 132 after the process of pushing and fixing the separator 132 by the mandrel 180-2 S90.

The electrode plates to be positioned are marked with A and B electrode plates, and the B electrode plate is a positive electrode plate when the A electrode plate is a negative electrode plate, and the negative electrode plate and the positive electrode plate are sequentially stacked one by one by crossing each other.

At this time, a size of the electrode plate that is stacked has a width slightly smaller (usually 1 mm to 3 mm) than a size of the separator 132 that is coated.

The (j) process is a process in which the distance between the pair of lower feeding rollers 160 is reduced and the pair of lower feeding rollers 160 is in contact with each other so that the separator moving member 150 can move the separator to the left side direction of the stacked secondary battery 116 S100. Furthermore, the tension applied to the separator 132 is the same pulled tension generated in the tension controlling unit 141.

In the (k) process, in a state in which the separator moving member 150 is stopped at the position (b) that is outward in the upper right direction of the stacked secondary battery 116, after the process of reducing the distance of the pair of lower feeding rollers 160 and contacting the pair of lower feeding rollers 160 to each other ends, the pair of lower feeding rollers 160 is operated and the separator 132 having a required length is supplied downward, and the required length is supplied to a length enough not to generate a tension when the separator 132 is pulled while the separator moving member 150 is stopped at the position (b) that is outward in the upper right direction of the stacked secondary battery 116 S110.

Thus, the section moving to the left side is described in detail for each process with reference to FIG. 11, in which FIG. 11 is a conceptual view illustrating a state of change in a length of the separator by the left side moving section of the separator tension controlling method for stacking the electrode plate of the secondary battery according to an exemplary embodiment of the present disclosure. Furthermore, the section moving to the right side is described in detail for each process with reference to FIG. 12, in which FIG. 12 is the conceptual view illustrating the state of change in the length of the separator by the right side moving section of the separator tension controlling method for stacking the electrode plate of the secondary battery according to an exemplary embodiment of the present disclosure. Furthermore, the sections moving to the left and right sides are continuously performed and one process is realized, and a product of the stacked secondary battery 116 is manufactured by repeating such processes.

Figures 13A, 13B:
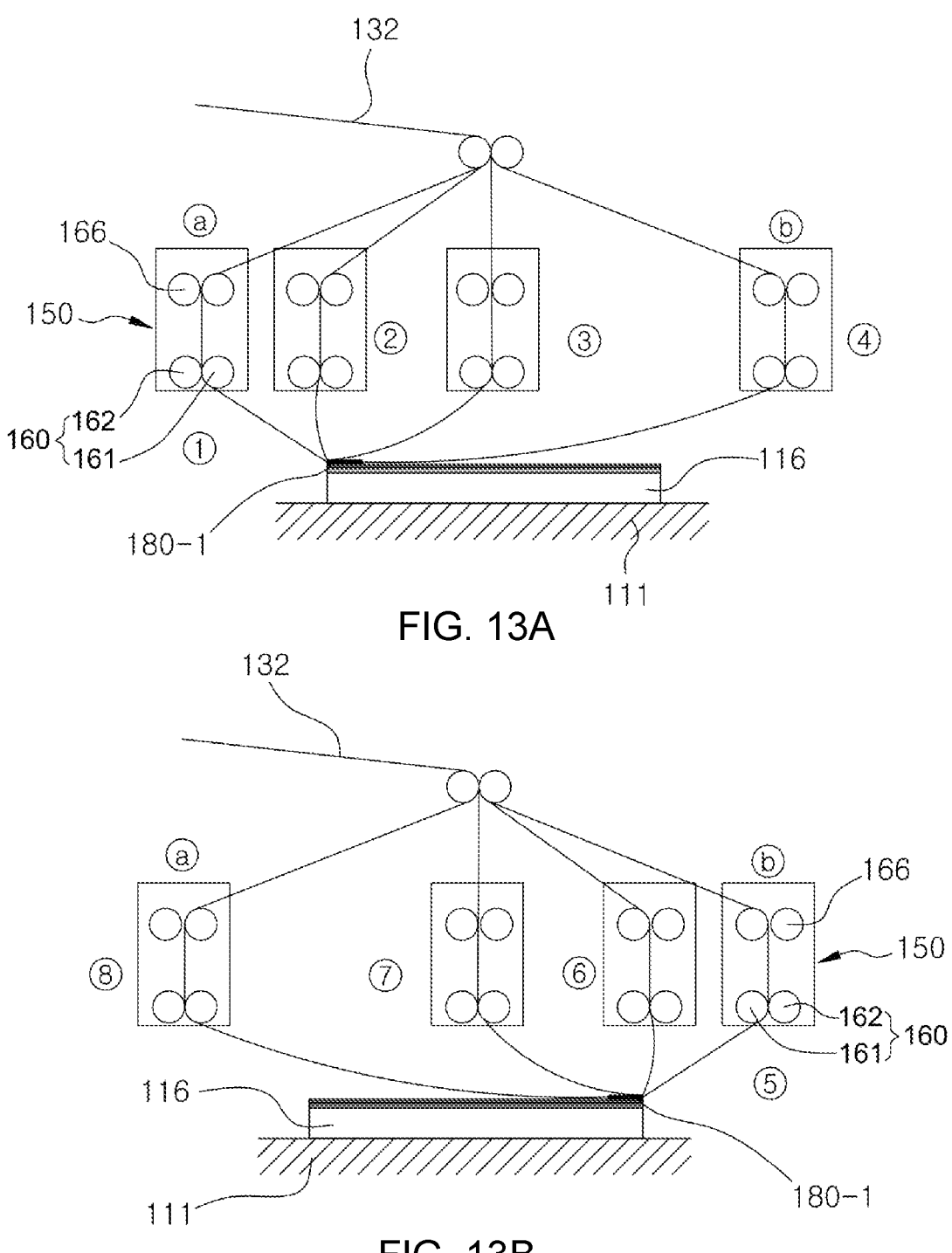
FIGS. 13A and 13B are conceptual views illustrating a state of a change in a length of the separator by the separator tension controlling method for stacking the electrode plate of the secondary battery according to an exemplary embodiment of the present disclosure.

FIGS. 13A and 13B are conceptual views illustrating a state of change in a length of the separator by the separator tension controlling method for stacking the electrode plate of the secondary battery according to an exemplary embodiment of the present disclosure.

As illustrated in FIG. 13A, the separator moving member 150 is moved to the position (b) from the position (a).

This means moving from the (e) process S50 in FIG. 11 to the (f) process S60. Furthermore, FIG. 13A is the drawing that specifically illustrate an interrelationship between the separator 132 and the separator moving member 150, and FIG. 13A illustrates a deflection situation of the separator 132 according to positions (1), (2), (3), and (4) that are positions of the separator moving member 150 in the section moving to the left side.

At this time, the position of (a) is the same as that of (1), and the position of (b) is the same as that of $\overline{4}$.

A process S50 is a process in which the distance between the pair of lower feeding rollers 160 is reduced and the pair of lower feeding rollers 160 is in contact with each other so that the separator moving member 150 can move the separator to the position (b) that is in the right side direction of the stacked secondary battery 116 from the position (1) or the position (a). Furthermore, the tension applied to the separator 132 is the same pulled tension generated in the tension controlling unit 141.

The distance between the first feeding roller 161 and the second feeding roller 162 is narrowed so that the separator 132 can be brought into close contact with the first and second feeding rollers 161 and 162 by the cylinder 172 that is the length changing means 170.

The first feeding roller 161 and the second feeding roller 162 that are in close contact with each other start to supply the separator 132, and the separator 132 pulled with the tension same as the tension generated in the tension controlling unit 141 is further supplied, so that the separator 132 is deflected in a shape that has no tension.

While the separator moving member 150 is moved to the position (b) or the position (4) from the position (a) or the position (1), the separator 132 is supplied through the first feeding roller 161 and the second feeding roller 162 so that the tension is not continuously applied. Therefore, until the separator moving member 150 reach the positions (2), (3), and (4), no tension is applied to the separator 132 and the separator 132 maintains the deflected shape.

The S60 process is a process in which the pair of lower feeding rollers 160 is operated and the separator 132 having the required length is supplied downward, the required length is a length enough not to generate a tension when the separator 132 is pulled while the separator moving member 150 is stopped at the position (b) that is outward in the upper right direction of the stacked secondary battery 116 and while the separator moving member 150 is moving, and the separator moving member 150 is stopped after the separator moving member 150 is moved.

In this manner, the separator moving member 150 is moved from the left side to the right side in the drawing. That is, the separator moving member 150 is moved from the position (a) to the position (b).

As illustrated in FIG. 13B that illustrates the section moving to the right side, the separator moving member 150 is moved to the position (a) from the position (b).

This means moving from the (j) process S100 in FIG. 12 to the (k) process S110. Furthermore, FIG. 13B is the drawing that specifically illustrate an interrelationship between the separator 132 and the separator moving member 150, and FIG. 13B illustrates a deflection situation of the separator 132 according to positions (5), (6), (7), and (8) that are positions of the separator moving member 150 in the section moving to the right side.

At this time, the position of (a) is the same as that of (1) and (8) and the position of (b) is the same as that of (4) and (5).

The S100 process is a process in which the distance between the pair of lower feeding rollers 160 is reduced and the pair of lower feeding rollers 160 is in contact with each other so that the separator moving member 150 can move the separator to the position (a) or (8) that is the left side direction of the stacked secondary battery 116 from the position (b) or (5). Furthermore, the tension applied to the separator 132 is the same pulled tension generated in the tension controlling unit 141.

The distance between the first feeding roller 161 and the second feeding roller 162 is narrowed so that the separator 132 can be brought into close contact with the first and second feeding rollers 161 and 162 by the cylinder 172 that is the length changing means 170.

The first feeding roller 161 and the second feeding roller 162 that are in close contact with each other start to supply the separator 132, and the separator 132 pulled with the tension same as the tension generated in the tension controlling unit 141 is further supplied, so that the separator 132 is deflected in a shape that has no tension.

While the separator moving member 150 is moved to the position ⓐ or the position ① from the position ⓑ or the position 4, the separator 132 is supplied through the first feeding roller 161 and the second feeding roller 162 so that the tension is not continuously applied. Therefore, until the separator moving member 150 reach the positions ⑥, ⑦, and ⑧, no tension is applied to the separator 132 and the separator 132 maintains the deflected shape.

The S110 process is a process in which the pair of lower feeding rollers 160 is operated and the separator 132 having the required length is supplied downward, the required length is a length enough not to generate a tension when the separator 132 is pulled while the separator moving member 150 is moved and stopped at the position ⓐ that is outward in the upper left direction of the stacked secondary battery 116 from the position ⓑ and while the separator moving member 150 is moving, and the separator moving member 150 is stopped after the separator moving member 150 is moved.

In this manner, the separator moving member 150 is moved from the right side to the left side in the drawing. That is, the separator moving member 150 is moved from the position ⓑ to the position ⓐ.

Since the first feeding roller 161 and the second feeding roller 162 that are in close contact with each other continuously supply the separator 132, the tension of the separator 132 is loosened again as the separator moving member 150 moves to the right side.

That is, when the separator 132 is supplied 1 mm to 5 mm longer than a length of a straight line connecting the lower feeding rollers 160 at the position ⓑ from the position of the mandrel 180-1 at the left side, no tension is applied to the separator 132 while the separator moving member 150 is moved to the position ⓑ from the position ⓐ, so that It is a very important requirement to improve the quality of the stacked secondary battery 116 by preventing a change in tension from the separator 132 that is already stacked or to be stacked.

Figure 14:
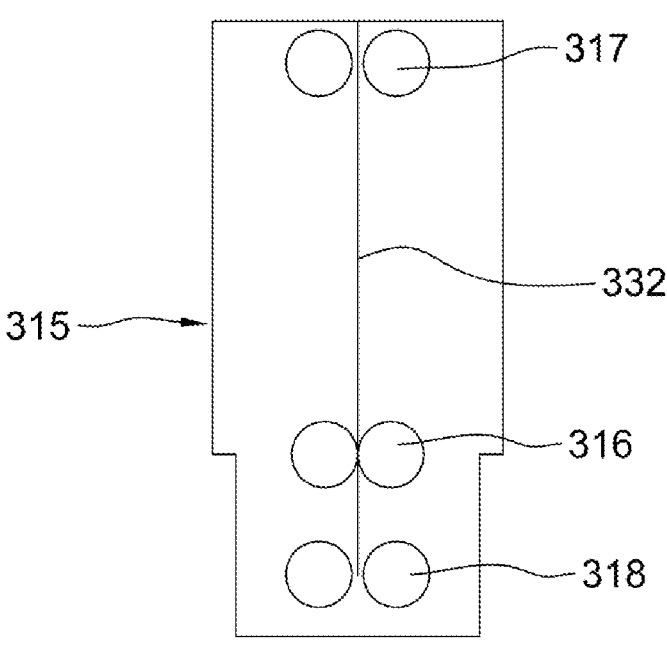
FIG. 14 is a conceptual view illustrating a configuration of the separator moving member according to another embodiment of the present disclosure.

FIG. 14 is a conceptual view illustrating a configuration of the separator moving member 150 according to another embodiment of the present disclosure.

As another embodiment, a separator moving member 315 may include lower guide rollers 318 so as to more accurately stack the separator 332 than the configuration illustrated in FIG. 9, the lower guide rollers 318 being mounted below the pair of lower feeding rollers 316.

Although the present disclosure invented by the present inventor has been described in detail with reference to the embodiments, the present disclosure is not limited to the above embodiments, and various modifications are possible without departing from the gist of the present disclosure.

What is claimed is:

1. A separator tension controlling apparatus for stacking an electrode plate of a secondary battery, the apparatus comprising:

a separator loading member on which a fixing plate is mounted such that a separator loading unit, a separator supplying member, and a separator moving member which are mounted on an upper surface of a table are capable of being mounted so that a negative electrode and a positive electrode of the secondary battery are capable of being stacked to cross each other by a separator;

the separator supplying member mounted on a first side of the separator loading unit such that the separator is capable of being supplied to the separator loading unit; and the separator moving member mounted on an upper side of the separator loading member such that the separator supplied from the separator supplying member is capable of being supplied with uniform tension, wherein the separator moving member is configured to be moved outward of the secondary battery that is stacked such that a tension of the separator is capable of being controlled, and a distance between a pair of lower feeding rollers that is mounted on the separator moving member is spaced apart by a predetermined distance such that the tension of the separator is pulled with a tension uniformly generated from a tension controlling unit, wherein the separator moving member comprises:

a first side plate and a second side plate formed in predetermined shapes;

a pair of upper guide rollers positioned at an upper portion of the separator moving member and configured to guide the separator;

sliding long holes respectively formed on the first and second side plates such that the distance between the lower feeding rollers is capable of being controlled;

the pair of lower feeding rollers mounted such that the pair of lower feeding rollers is capable of being moved along the sliding long holes; and a length changing means mounted on the sliding long holes and configured to control the distance between the pair of lower feeding rollers controlling the tension of the separator.

2. The apparatus of claim 1, wherein the length changing means is coupled to roller shafts via bearings, is configured to move the pair of lower feeding rollers mounted in the sliding long holes in opposite directions, and is configured to move the pair of lower feeding rollers such that the pair of lower feeding rollers is in close contact to each other or is spaced apart from each other.

3. The apparatus of claim 1, wherein the length changing means is mounted and moved on any one of the pair of the lower feeding rollers, and the other one of the pair of the lower feeding rollers is formed of a fixed shaft that is configured to perform a simple rotation.

4. The apparatus of claim 2, wherein the length changing means is formed of any one of a cylinder, a solenoid, and an LM guider.

5. The apparatus of claim 1, wherein a driving means feeding the pair of lower feeding rollers is configured to be individually coupled to the pair of lower feeding rollers, thereby driving the pair of lower feeding rollers.

6. The apparatus of claim 1, wherein a driving means feeding the pair of lower feeding rollers is configured to be selectively coupled to one of the pair of lower feeding rollers, and the other of the pair of lower feeding rollers is a driven roller that does not have driving power.

7. The apparatus of claim 1, wherein the separator supplying member comprises: a separator supplying unit configured to release the separator that is wound in a roll form; and the tension controlling unit mounted on a first side of the separator supplying unit such that the tension of the separator that is supplied to the separator moving member is controlled.

8. A separator tension controlling method for stacking an electrode plate of a secondary battery, the method being configured to control a tension of a separator which is wound in a roll form and which surrounds the electrode plate alternately between a negative electrode plate and a positive electrode plate, and the method comprising:

a process of stacking the separator with uniform tension by moving a separator moving member to a left side section; and a process of stacking the separator with the uniform tension by moving the separator moving member to a right side section, wherein the separator moving member comprises:

a first side plate and a second side plate formed in predetermined shapes;

a pair of upper guide rollers positioned at an upper portion of the separator moving member and configured to guide the separator;

sliding long holes respectively formed on the first and second side plates such that a distance between a pair of lower feeding rollers is capable of being controlled;

the pair of lower feeding rollers mounted such that the pair of lower feeding rollers is capable of being moved along the sliding long holes; and a length changing means mounted on the sliding long holes and configured to control the distance between the pair of lower feeding rollers controlling the tension of the separator.

9. The method of claim 8, wherein the process of stacking the separator with the uniform tension by moving the separator moving member to the left side section comprises:

(a) supplying the separator to a first position that is outward in an upper left direction of a stacked secondary battery by the separator moving member such that the negative electrode plate, the positive electrode plate, and the separator of the secondary battery are capable of being sequentially stacked, and moving and stopping the separator moving member;

(b) separating a distance of a pair of lower feeding rollers from the first position so that the tension of the separator is equal to a tension of a tension controlling unit that is positioned above the separator moving member, the pair of lower feeding rollers being in close contact with each other and being mounted on the separator moving member;

(c) fixing the separator by pushing the separator with a mandrel;

(d) stacking an A electrode plate (any one electrode plate among the negative electrode plate and the positive electrode plate) by normally positioning the A electrode plate on the separator;

(e) narrowing the distance of the pair of lower feeding rollers of the separator moving member; and (f) moving and stopping the separator moving member to a second position that is outward in an upper right direction of the stacked secondary battery from the first position.

10. The method of claim 8, wherein the process of stacking the separator with the uniform tension by moving the separator moving member to the right side section comprises:

(f) moving and stopping the separator moving member to a second position that is outward in an upper right direction of a stacked secondary battery from a first position;

(g) separating a distance of a pair of lower feeding rollers from the second position so that the tension of the separator is equal to a tension of a tension controlling unit that is positioned above the separator moving member, the pair of lower feeding rollers being in close contact with each other and being mounted on the separator moving member;

(h) fixing the separator by pushing the separator with a mandrel;

(i) stacking a B electrode plate (any one electrode plate among the negative electrode plate and the positive electrode plate, not the electrode plate used as an A electrode plate) by normally positioning the B electrode plate on the separator;

(j) narrowing the distance of the pair of lower feeding rollers of the separator moving member; and (k) supplying the separator to the first position that is outward in the upper left direction of the stacked secondary battery from the second position by the separator moving member, and moving and stopping the separator moving member.

11. The method of claim 8, wherein the separator moving member reciprocates between sections of first and second positions and is moved while maintaining the tension of the separator not to be applied, and the tension of the separator is pulled to be equal to the tension of the separator of a tension controlling unit that is positioned above the separator moving member while a distance between lower feeding rollers is spaced apart.

12. The method of claim 8, wherein lower feeding rollers of the separator moving member comprise a pair of lower feeding rollers such that the separator is engaged and is in close contact with the pair of lower feeding rollers and the separator is capable of being moved in a horizontal direction by a horizontal movement of the separator moving member, the separator is supplied more than a required length of the separator during horizontally moving the separator moving member such that the tension is not applied to the separator during moving the separator moving member, a distance between the pair of lower feeding rollers is controlled by a length changing means mounted on each of the pair of lower feeding rollers, the separator is pulled such that the tension of the separator is equal to the tension of the separator of a tension controlling unit positioned above the separator moving member while the distance between the lower feeding rollers is spaced apart from first and second positions that are outward in upper left and right directions of a stacked secondary battery so as to maintain the uniform tension, and the separator is stacked, thereby preventing reverse movement phenomenon of the separator.

13. The method of claim 9, wherein a first feeding roller and a second feeding roller of the lower feeding rollers are moved by 1 mm to 6 mm, so that the tension of the separator is pulled to be equal to the tension of the separator of the tension controlling unit positioned above the lower feeding rollers.

14. The method of claim 9, wherein, in the process (c) and a process (h), the separator is pushed at the first position and the second position by the mandrel so that the tension of the separator stacked between each mandrel is equal to the tension of the separator positioned above each mandrel, thereby stacking the stacked secondary battery with the uniform tension of the separator.

15. The method of claim 9, wherein, in the process (a) and the process (b), before the separator moving member supplies the separator to the first position and the separator moving member moves and stops by reaching the first position, separating the distance between the pair of lower feeding rollers from the first position so that the tension of the separator in the process (b) is equal to the tension of the tension controlling unit positioned above the separator moving member is performed, the pair of lower feeding rollers being in close contact with each other and being mounted on the separator moving member, or in the process (f) and a process (g), before the separator moving member supplies the separator to the second position and the separator moving member moves and stops by reaching the second position, separating the distance between the pair of lower feeding rollers from the second position so that the tension of the separator in the process (g) is equal to the tension of the tension controlling unit positioned above the separator moving member is performed, the pair of lower feeding rollers being in close contact with each other and being mounted on the separator moving member.

16. The method of claim 14, wherein when the separator reciprocates the first position and the second position, the separator longer than a required length is continuously supplied, so that the separator is moved while the separator maintains a state in which the tension of the separator is not generated.

* * * * *